(12) United States Patent
Ribeiro et al.

(10) Patent No.: US 12,275,813 B2
(45) Date of Patent: *Apr. 15, 2025

(54) POLYMERIZABLE COMPOSITION FOR OPTICAL MATERIALS AND APPLICATION OF SAME

(71) Applicant: MITSUI CHEMICALS, INC., Tokyo (JP)

(72) Inventors: Nigel Ribeiro, Omuta (JP); Hongbo Wang, Singapore (SG); Yixi Lin, Singapore (SG)

(73) Assignee: MITSUI CHEMICALS, INC., Tokyo (JP)

( * ) Notice: Subject to any disclaimer, the term of this patent is extended or adjusted under 35 U.S.C. 154(b) by 494 days.

This patent is subject to a terminal disclaimer.

(21) Appl. No.: 16/771,788

(22) PCT Filed: Dec. 14, 2018

(86) PCT No.: PCT/JP2018/046196
§ 371 (c)(1),
(2) Date: Jun. 11, 2020

(87) PCT Pub. No.: WO2019/117305
PCT Pub. Date: Jun. 20, 2019

(65) Prior Publication Data
US 2021/0017327 A1    Jan. 21, 2021

(30) Foreign Application Priority Data
Dec. 15, 2017   (SG) ................ 10201710468Q

(51) Int. Cl.
*C08G 18/66* (2006.01)
*C08G 18/38* (2006.01)
(Continued)

(52) U.S. Cl.
CPC ...... *C08G 18/6633* (2013.01); *C08G 18/3876* (2013.01); *C08G 18/4277* (2013.01);
(Continued)

(58) Field of Classification Search
CPC ........... C08G 18/4277; C08G 18/6633; C08K 5/1545; G02B 1/041
See application file for complete search history.

(56) References Cited

U.S. PATENT DOCUMENTS

| 4,929,693 A | 5/1990 | Akashi et al. |
|---|---|---|
| 5,166,345 A | 11/1992 | Akashi et al. |

(Continued)

FOREIGN PATENT DOCUMENTS

| DE | 102009052986 A1 | 5/2010 |
|---|---|---|
| EP | 0 944 689 A1 | 9/1999 |

(Continued)

OTHER PUBLICATIONS

Chemical Book Norbornene diisocyanate. Available at: https://www.chemicalbook.com/ChemicalProductProperty_EN_CB61105450.htm (Year: 2022).*

(Continued)

*Primary Examiner* — Michael M Dollinger
(74) *Attorney, Agent, or Firm* — BUCHANAN INGERSOLL & ROONEY PC

(57) ABSTRACT

The polymerizable composition for optical materials of the present invention includes a polyester polyol (a), a compound (b) of which light absorption characteristics vary by sensing changes in environment; and a polymerization reactive compound (c).

19 Claims, 1 Drawing Sheet

CS-TEM of example a4

(51) Int. Cl.
- *C08G 18/42* (2006.01)
- *C08G 18/76* (2006.01)
- *C08K 5/1545* (2006.01)
- *G02B 1/04* (2006.01)

(52) U.S. Cl.
CPC ........ *C08G 18/7642* (2013.01); *C08K 5/1545* (2013.01); *G02B 1/041* (2013.01)

(56) References Cited

U.S. PATENT DOCUMENTS

| | | | |
|---|---|---|---|
| 5,679,756 A * | 10/1997 | Zhu | C08G 18/7671 528/65 |
| 6,083,427 A * | 7/2000 | Henry | C08G 18/3293 528/48 |
| 6,531,076 B2 | 3/2003 | Crano et al. | |
| 8,153,344 B2 | 4/2012 | Faler et al. | |
| 8,563,212 B2 | 10/2013 | Bowles et al. | |
| 8,563,213 B2 | 10/2013 | Bowles et al. | |
| 9,778,396 B2 | 10/2017 | Ryu | |
| 2004/0021133 A1 | 2/2004 | Nagpal et al. | |
| 2004/0180211 A1 | 9/2004 | Moravec et al. | |
| 2006/0014099 A1 | 1/2006 | Faler et al. | |
| 2006/0241273 A1 * | 10/2006 | Bojkova | C08G 18/724 528/44 |
| 2007/0202265 A1 * | 8/2007 | Berzon | B29D 11/0073 427/407.1 |
| 2007/0238848 A1 * | 10/2007 | Bojkova | C08G 18/12 528/44 |
| 2010/0209697 A1 | 8/2010 | Bowles et al. | |
| 2010/0221661 A1 | 9/2010 | Bowles et al. | |
| 2013/0215488 A1 | 8/2013 | Hiraren et al. | |
| 2014/0340727 A1 | 11/2014 | Mori et al. | |
| 2015/0024126 A1 | 1/2015 | Hernando Campos et al. | |
| 2015/0152322 A1 | 6/2015 | Nakayama et al. | |
| 2015/0177416 A1 | 6/2015 | Ryu | |
| 2017/0002176 A1 | 1/2017 | Kadowaki | |
| 2019/0048122 A1 | 2/2019 | Kasori et al. | |
| 2019/0127508 A1 * | 5/2019 | Ryu | C08G 18/3876 |
| 2019/0284324 A1 | 9/2019 | Ribeiro et al. | |

FOREIGN PATENT DOCUMENTS

| | | | |
|---|---|---|---|
| JP | S64029489 A | | 1/1989 |
| JP | H01152182 A | | 6/1989 |
| JP | 2008506031 A | | 2/2008 |
| JP | 2013033131 A | | 2/2013 |
| JP | 2016132696 A | | 7/2016 |
| JP | 2016169363 A | * | 9/2016 |
| JP | 2016199694 A | | 12/2016 |
| WO | 98/03890 A1 | | 1/1998 |
| WO | 2004011506 A1 | | 2/2004 |
| WO | 2010110784 A1 | | 9/2010 |
| WO | 2014002844 A1 | | 1/2014 |
| WO | 2014007154 A1 | | 1/2014 |
| WO | 2015115648 A1 | | 8/2015 |
| WO | 2017047745 A1 | | 3/2017 |
| WO | 2018070383 A1 | | 4/2018 |

OTHER PUBLICATIONS

ChemNet Norbornane diisocyanate. Available at: http://www.chemnet.com/ChinaSuppliers/11409/Norbornane-Di-Isocyanate--322758.html (Year: 2022).*

Guide Chem Norbornene diisocyanate. Available at: https://www.guidechem.com/cas/74091-64-8.html (Year: 2022).*

Alexandridis et al., "Poly(ethylene oxide)-poly(propylene oxide)-poly(ethylene oxide) block copolymer surfactants in aqueous solutions and at interfaces: thermodynamics, structure, dynamics, and modeling", Colloids and Surfaces A: Physicochemical and Engineering Aspects, 1995, 96, pp. 1-46.

International Search Report (PCT/ISA/210) issued on Mar. 12, 2019, by the Japanese Patent Office as the International Searching Authority for International Application No. PCT/JP2018/046196.

Lam et al., "Direct visualisation of micelles of Pluronic block copolymers in aqueous solution by cryo-TEM", Phys. Chem. Chem. Phys., 1999, 1, pp. 3331-3334.

* cited by examiner

CS-TEM of example a4

25nm X400,000

CS-TEM of example a7

25nm X400,000

POLYMERIZABLE COMPOSITION FOR OPTICAL MATERIALS AND APPLICATION OF SAME

TECHNICAL FIELD

The present invention relates to a polymerizable composition including a photochromic compound for optical materials, and an optical material and a plastic lens obtained from the composition.

BACKGROUND ART

Since plastic lenses are light, not easily cracked, and can be stained, plastic lenses have been rapidly distributed as optical materials such as eyeglass lenses and camera lenses, and hitherto, molded bodies for lenses using a variety of plastic materials have been developed and used.

Representative examples include an allyl resin obtained from diethylene glycol bisallyl carbonate and diallyl isophthalate, a (meth)acrylic resin obtained from (meth)acrylate, and a polythiourethane resin obtained from isocyanate and thiol.

In addition, in recent years, high-performance plastic lenses to which various functions were imparted have been developed, and for example, a lens in which light having a harmful wavelength is blocked, a lens in which scratches on the surface are suppressed, and a lens in which cloudiness on the lens surface caused by a temperature difference is suppressed have been known. Plastic lenses having photochromic performance also is one of such high-performance plastic lenses, and development thereof has been progressing. By using the plastic lenses having such photochromic performance, it is possible to obtain eyeglasses which functions as typical eyeglasses having a transparent color indoors, and by the lenses being colored gray or brown in response to sunlight (ultraviolet rays) outdoors, exhibits a function to protect the eyes from glare. The eyeglasses are high-performance eyeglasses which do not need to be worn outdoors and taken off indoors as sunglasses are worn outdoors and taken off indoors and capable of being used both indoors and outdoors, and in recent years, the demand therefor has been expanding globally.

The plastic lens having such photochromic performance is required to be fast responsive for coloring and decoloring and exhibit good coloring performance.

For example, by using a specific aliphatic isocyanate or a specific alicyclic isocyanate, it is possible to obtain a urethane resin-based optical material or a thiourethane resin-based optical material and a plastic lens including a photochromic compound without causing deterioration in performance of the photochromic compound (Patent Document 1).

According to the polymerizable composition for optical materials including a specific polyol compound, it is possible to obtain a polyurethane-based optical material or a polythiourethane-based optical material including a photochromic compound, which exhibits excellent photochromic performance without causing deterioration in performance of the photochromic compound, and is also excellent in physical properties such as mechanical strength (Patent Document 2).

In addition, by improving dispersibility by suppressing aggregation of a photochromic compound in a polymerizable composition for optical materials or a resin for optical materials, a technology for improving the photochromic performance of a resin has been proposed. As such a technique, for example, polymer fine particles containing a photochromic compound in a polymer has been proposed (Patent Documents 3 to 7). In addition, a resin for optical materials including nanoparticles containing a photochromic compound and having a refractive index of 1.595 to 1.695 has been also proposed (Patent Document 8).

RELATED DOCUMENTS

Patent Documents

[Patent Document 1] WO 2014/002844
[Patent Document 2] WO 2015/115648
[Patent Document 3] WO 2014/007154
[Patent Document 4] JP2008-506031
[Patent Document 5] JPS64-29489
[Patent Document 6] JPH1-152182
[Patent Document 7] DE102009052986
[Patent Document 8] WO 2004/011506
[Patent Document 9] U.S. Pat. No. 6,531,076
[Patent Document 10] WO 2017/047745

Non-Patent Documents

[Non-Patent Document 1] P. Alexandridis, T. A. Hatton/ Colloids Surfaces A: Physicochem. Eng. Aspects 96 (1995) 1-46
[Non-Patent Document 2] Phys. Chem. Chem. Phys., 1999, 1, 3331-3334

SUMMARY OF THE INVENTION

Technical Problem

In Patent Document 3, a method of producing a photochromic pigment-containing polythiourethane resin from a polymerizable composition including a polyolefin-based terminal branched copolymer, a naphthopyran-based photochromic pigment, and as a polymerizable monomer, 1,2-bis(2-mercaptoethyl)thio-3-mercaptopropane, pentaerythritoltetra(3-mercaptopropionate), and norbornene diisocyanate is disclosed. However, it is necessary that after polymer particles containing a photochromic pigment are prepared from a polyolefin-based terminal branched copolymer and a naphthopyran-based photochromic pigment in advance, a resin is produced by mixing the polymer particles with a polymerizable monomer, and thus, there are problems that the production process becomes long, and the production efficiency of the resin is significantly reduced.

In addition, since in a case where the polymer particles and the polymerizable monomer are mixed, the reactivity between the polymer particles and the polymerizable monomer is high, the viscosity of the polymerizable composition is easily increased, and due to this, the pot life of the polymerizable composition is shortened, and a resin molded body cannot be efficiently produced in some cases, and therefore, there is room for improvement.

Solution to Problem

As a result of thorough studies, the present inventors found that by using a specific polymer, it is possible to obtain a polymerizable composition which has excellent handling properties by suppression of viscosity increase, and it is possible to provide an optical material which has excellent photochromic characteristics, excellent heat resistance, and excellent mechanical properties, and completed the present invention. That is, the present invention can be described as follows.

[1] A polymerizable composition for optical materials includes: a polyester polyol (a); a photochromic compound (b); and a polymerization reactive compound (c), other than the polyester polyol (a), wherein the polymerization reactive compound (c) consisting of one or more compounds selected from a polyiso(thio)cyanate compound, a (thio)epoxy compound, an oxetanyl compound, a thietanyl compound, a (meth)acryloyl compound, a (meth)allyl compound, an alkene compound, an alkyne compound, a di- or higher functional active hydrogen compound, and an acid anhydride.

[2] The polymerizable composition for optical materials according to [1], wherein the polyester polyol (a) has a weight average molecular weight of more than 500 g/mol and 20,000 g/mol or less.

[3] The polymerizable composition for optical materials according to [1], wherein the photochromic compound (b) is a naphthopyran derivative.

[4] The polymerizable composition for optical materials according to any one of [1] to [3], wherein the polyester polyol (a) is polycaprolactone polyol.

[5] The polymerizable composition for optical materials according to any one of [1] to [3], wherein the polyester polyol (a) is polyester diol.

[6] The polymerizable composition for optical materials according to [5], wherein the polyester diol is polycaprolactone diol.

[7] The polymerizable composition for optical materials according to any one of [1] to [6], wherein the polyiso(thio)cyanate compound is an aliphatic polyiso(thio)cyanate compound, an alicyclic polyiso(thio)cyanate compound, or an aromatic polyiso(thio)cyanate compound, and wherein the di- or higher functional active hydrogen compound consists of one or more compounds selected from poly(thi)ol compounds having two or more hydroxyl groups or mercapto groups.

[8] The polymerizable composition for optical materials according to [7], wherein the aliphatic polyiso(thio)cyanate compound is metaxylylene diisocyanate, wherein the alicyclic polyiso(thio)cyanate compound consists of one or more compounds selected from 2,5-bis(isocyanatomethyl) bicyclo-[2.2.1]-heptane, and 2,6-bis(isocyanatomethyl) bicyclo-[2.2.1]-heptane, and wherein the poly(thi)ol compound having two or more hydroxyl groups or mercapto groups consists of one or more compounds selected from pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

[9] A cured body is obtained by curing the polymerizable composition for optical materials according to any one of [1] to [8].

[10] A molded body is obtained by curing the polymerizable composition in a mold for optical materials according to any one of [1] to [8].

[11] An optical material is formed of the molded body according to [10].

[12] A plastic lens is formed of the molded body according to [10].

[13] A production method of a polymerizable composition for optical materials includes: mixing a polyester polyol (a); a photochromic compound (b); and a polymerization reactive compound (c), other than the polyester polyol (a), wherein the polymerization reactive compound (c) consisting of one or more compounds selected from a polyiso(thio)cyanate compound, a (thio)epoxy compound, an oxetanyl compound, a thietanyl compound, a (meth)acryloyl compound, a (meth)allyl compound, an alkene compound, an alkyne compound, a di- or higher functional active hydrogen compound, and an acid anhydride.

[14] The production method of a polymerizable composition for optical materials according to [13], wherein the polyester polyol (a) has a weight average molecular weight of more than 500 g/mol and 20,000 g/mol or less.

[15] The production method of a polymerizable composition for optical materials according to [13], wherein the photochromic compound (b) is a naphthopyran derivative.

[16] The production method of a polymerizable composition for optical materials according to [13], wherein the polyester polyol (a) is polycaprolactone polyol.

[17] The polymerizable method of a polymerizable composition for optical materials according to [13], wherein the polyester polyol (a) is polyester diol.

[18] The production method of a polymerizable composition for optical materials according to [17], wherein the polyester diol is polycaprolactone diol.

[19] The production method of a polymerizable composition for optical materials according to any one of [13] to [18], wherein the mixing the polyester polyol (a), the photochromic compound (b), and the polymerization reactive compound (c) includes forming polymer particles comprising the polyester polyol (a) and the photochromic compound (b), and then mixing the polymerization reactive compound (c) with the polymer particles.

[20] The production method of a polymerizable composition for optical materials according to any one of [13] to [18], wherein the polymerization reactive compound (c) consists of two or more compounds selected from a polyiso(thio)cyanate compound, a (thio)epoxy compound, an oxetanyl compound, a thietanyl compound, a (meth)acryloyl compound, a (meth)allyl compound, an alkene compound, an alkyne compound, a di- or higher functional active hydrogen compound, and an acid anhydride, and wherein the mixing the polyester polyol (a), the compound (b), and the polymerization reactive compound (c) includes mixing the polyester polyol (a), the compound (b), and one or more of the polymerization reactive compound (c) to make a mixture, and then mixing remaining polymerization reactive compound (c) with the mixture.

[21] A production method of a cured body includes: polymerizing and curing the polymerizable composition for optical materials according to any one of [1] to [8], wherein the method includes forming a resin by polymerization of the polymerization reactive compound (c), forming a nanodomain separation structural body by the polyester polyol (a), and forming a cured body formed of the resin, the nanodomain separation structural body, and the compound (b).

[22] A production method of a plastic lens includes: forming a lens substrate by cast-polymerizing the polymerizable composition for optical materials according to any one of [1] to [8].

[23] The production method of a plastic lens according to [22], wherein the forming the lens substrate includes forming a resin by polymerization of a polymerization reactive compound (c), forming a nanodomain separation structural body by the polyester polyol (a), and forming a lens substrate formed of the resin, the nanodomain separation structural body, and the compound (b).

[24] The production method of a polymerizable composition for optical materials according to [13], wherein the di- or higher functional active hydrogen compound consists of one or more compounds selected from poly(thi)ol compounds having two or more hydroxyl groups or mercapto groups.

Advantageous Effects of Invention

The polymerizable composition for optical materials of the present invention can provide an optical material which has excellent handling properties by suppression of viscosity increase, and excellent photochromic characteristics, excellent heat resistance, and excellent mechanical properties.

BRIEF DESCRIPTION OF THE DRAWINGS

The above-described purpose and the other purposes, features and advantages become apparent with the suitable embodiments and drawings accompanied therewith described below.

DESCRIPTION OF EMBODIMENTS

Figure 1:
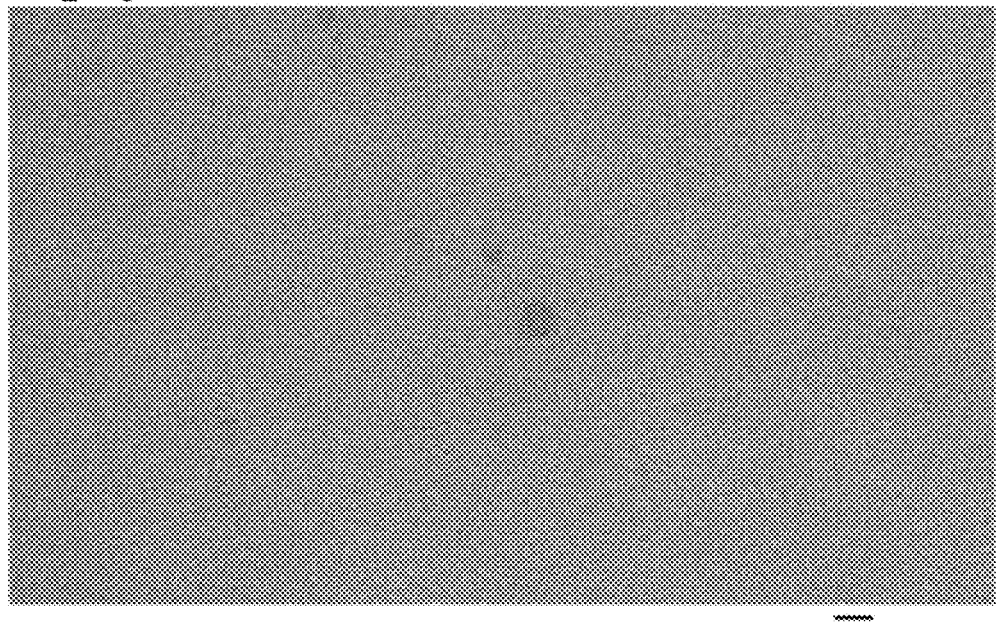
FIG. 1 is a cross sectional Transmission Electron Microscope (TEM) picture of nanodomain separation structural body made of polycaprolactone diol from example a4.

The polymerizable composition for optical materials of the present invention includes a polyester polyol (a), a compound (b) of which light absorption characteristics vary by sensing changes in environment, and a polymerization reactive compound (c).

Hereinafter, the present invention will be described with reference to embodiments.

(Polyester Polyols (a))

In one embodiment, the polyester polyol (a) does not include a compound which is comprised of only constituent unit obtained by ring-opening of a lactone.

The polyester polyols are obtained by ring opening polymerization of a lactone, in the presence of an initiator, namely a diol or a polyol with 3 or more hydroxyl groups. Examples of lactone include caprolactone, propiolactone, and butyrolactone. Examples of diol initiator include ethylene glycol, propylene glycol, neopentyl glycol, 1,2-propanediol, 1,4-butanediol, and 1,6-hexanediol. Examples of polyol initiator with 3 or more primary hydroxyl groups include trimethylolpropane, Pentaerythritol, and dipentaerythritol.

The polyester polyol (a) can have any suitable weight average molecular weight. The polymerizable composition containing the polyester polyol (a) having any suitable weight average molecular weight can provide an optical material which has more excellent handling properties by suppression of viscosity increase, and more excellent photochromic characteristics. In one embodiment, polyester polyols (a) that have a weight average molecular weight of more than 500 g/mol and 20,000 g/mol or less, preferably 1,000 g/mol or more and 15,000 g/mol, more preferably 2,000 g/mol or more and 10,000 g/mol or less can be used. In another embodiment, polycaprolactone diols that have a weight average molecular weight of more than 500 g/mol and 20,000 g/mol or less, preferably 1,000 g/mol or more and 15,000 g/mol, more preferably 2,000 g/mol or more and 10,000 g/mol or less, 3,000 g/mol or more and 10,000 g/mol or less can be used. In still another embodiment, polycaprolactone diols that have a weight average molecular weight of more than 4,000 g/mol and 10,000 g/mol or less can be used. The following weight average molecular weight of polycaprolactone diols can be appropriate in some emobodiments: 5,000 g/mol or more and 10,000 g/mol or less; 6,000 g/mol or more and 10,000 g/mol or less; 7,000 g/mol or more and 10,000 g/mol or less; 8,000 g/mol or more and 10,000 g/mol or less; 8,000 g/mol or more and 10,000 g/mol or less; and 9,000 g/mol or more and 10,000 g/mol or less.

(Polycaprolactone Diol)

In one embodiment, polycaprolactone diol can be used as the polyester polyol (a). Polycaprolactone diol is a linear polyester diol derived from caprolactone monomer, terminated by primary hydroxyl groups. The compound is represented by the following General Formula (1).

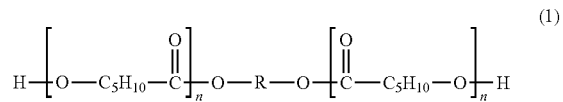

In General Formula (1), R represents the diol, and n represents a unit number of the caprolactone monomer, and each unit number is an integer of 2 to 88.

(Polycaprolactone Polyol)

In one embodiment, polycaprolactone polyols can be used as the polyester polyol (a). The compound is represented by the following General Formula (2). They are available under the designation CAPA(R) polycaprolactone polyol by the company PERSTORP or PLACCEL(R) by the company DAICEL(R).

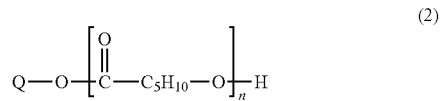

In general formula (2), Q represents the polyol with 3 or more primary hydroxyl groups, and n represents a unit number of the caprolactone monomer, and each unit number is an integer of 2 to 58.

(Compound (b))

In one embodiment, a compound (b) of which light absorption characteristics vary by sensing changes in environment is used. Examples of the changes in environment include wavelength changes of light, temperature changes, application of electricity, and types of solvents. Examples of light absorption characteristics include an absorption spectrum, an intensity change ratio in absorbance at a specific wavelength, and an intensity change rate in absorbance at a specific wavelength. Examples of the compound (b) include a chromic compound (hereinafter, also referred to as a chromic material or a chromic pigment), and the following compounds can be used.

(Photochromic Compound)

The molecular structure of the photochromic compound is changed reversibly by irradiation with light having a specific wavelength, and due to this, the light absorption characteristics (absorption spectrum) changes. Examples of the photochromic compound used in one embodiment include a compound of which the light absorption characteristics (absorption spectrum) changes with respect to light having a specific wavelength. As the photochromic compound, known photochromic compounds can be used, and examples thereof include compounds derived from compounds such as naphthopyran, chromene, spiropyran, spirooxazine and thiospiropyran, benzopyran, stilbene, azobenzene, thioindigo, bisimidazole, spirodihydroindolizine, quinine, perimidine-spirocyclohexadienone, viologen, fulgide, fulgimide, diarylethene, hydrazine, aniline, aryl disulfide, arylthioether sulfonate, spiroperimidine, and triarylmethane. In one embodiment, as the photochromic compound, a naphthopyran derivative is preferably used.

(Thermochromic Compound)

The light absorption characteristics (absorption spectrum) of the thermochromic compound changes depending on the temperature. Examples of the thermochromic compound include leuco compounds, and specific examples include phthalide, phthalan, an acyl-leucomethylene compound, fluoran, spiropyran, and coumarin. Specific examples of the fluoran include 3,3'-dimethoxyfluoran, 3,6-dimethoxyfluoran, 3,6-di-butoxyfluoran, 3-chloro-6-phenylamino-fluoran, 3-diethylamino-6-dimethyl fluoran, 3-diethylamino-6-methyl-7-chlorofluoran, 3-diethyl-7,8-benzofluoran, 3,3'-bis-(p-dimethyl-aminophenyl)-7-phenylaminofluoran, 3-diethylamino-6-methyl-7-phenylamino-fluoran, 3-diethylamino-7-phenylaminofluoran, and 2-amino-3-methyl-6-diethylamino-fluoran. Similarly, examples of the phthalide include 3,3',3"-tris(p-dimethylamino-phenyl)phthalide, 3,3-bis(p-dimethyl-aminophenyl)phthalide, 3,3-bis(p-diethylamino-phenyl)-6-dimethylamino-phthalide, and 3-(4-diethylamino)phenyl.

Since these changes in the absorption spectrum are derived from the molecular structure changes due to an acid-base reaction (protonation-deprotonation) of the molecule, a proton donating agent (also referred to as a "developer") which generates an acid depending on the temperature can also be included.

Examples of the proton donating agent include phenol, azole, organic acids, esters of organic acids, and salts of organic acids.

Examples of the phenol include phenylphenol, bisphenol A, cresol, resorcinol, chlororesorcinol, fÀ-naphthol, 1,5-dihydroxynaphthalene, pyrocatechol, pyrogallol, and a trimer of a p-chlorophenol-formaldehyde condensate. Examples of the azole include benzotriazoles (for example, 5-chlorobenzotriazole, 4-laurylaminosulfobenzotriazole, 5-butylbenzotriazole, dibenzotriazole, 2-oxybenzotriazole, and 5-ethoxycarbonylbenzotriazole), imidazole (for example, oxybenzimidazole), and tetrazole.

Examples of the organic acid include aromatic carboxylic acids (for example, salicylic acid, resorcylic acid, and benzoic acid) and aliphatic carboxylic acids (for example, stearic acid, 1,2-hydroxystearic acid, tartaric acid, citric acid, oxalic acid, and lauric acid).

To control the reaction by a thermochromic compound and a developer, a proton accepting agent (also referred to as a "desensitizer") which receives an acid depending on the temperature can also be included. Examples of the proton accepting agent include polyhydric alcohols, fatty acid esters, glycol ethers, and polyethylene glycol type nonionic active agents.

(Other Chromic Compounds)

Examples of other chromic compounds include an electrochromic compound of which light absorption characteristics vary by electricity (application of a voltage) and a solvatochromic compound of which light absorption characteristics vary depending on the type of solvent which is in contact.

The mass ratio of the polyester polyol (a) to the chromic compound (b) is not particularly limited, but is preferably (b) 0.01 to 100 parts by weight to (a) 100 parts by weight, and more preferably (b) 1 to 10 parts by weight to (a) 100 parts by weight.

(Polymerization Reactive Compound (c))

In the polymerization reactive compound (c), even in the presence or absence of the additives such as an initiator and a catalyst added as necessary, a polymerization reactive compound having at least one or more polymerizable functional groups which are capable of being self-polymerized, copolymerized, or addition-polymerized is included. The polymerization reactive compound (c) does not include the polyester polyol (a).

Examples of the polymerization reactive compound include a polyiso(thio)cyanate compound having two or more isocyanate groups or isothiocyanate group, a (thio) epoxy compound having one or more epoxy groups or thioepoxy groups, an oxetanyl compound having one or more oxetanyl groups, a thietanyl compound having one or more thietanyl groups or having an oxetanyl group and a thietanyl group, a (meth)acryloyl compound having one or more methacryloyloxy groups, acryloyloxy groups, methacryloylthio groups, acryloylthio groups, methacrylamide groups, or acrylamide groups, a (meth)allyl compound having one or more methallyl groups or allyl groups, an alkene compound having one or more polymerizable carbon-carbon double bond groups other than a methacryloyloxy group, an acryloyloxy group, a methacryloylthio group, an acryloylthio group, a methacrylamide group, or an acrylamide group, an alkyne compound having one or more polymerizable carbon-carbon triple bond groups, a di- or higher functional active hydrogen compound, and an acid anhydride having one or more acid anhydride groups, and one or two or more compounds selected from these can be used.

Examples of the polyiso(thio)cyanate compound include aliphatic polyisocyanate compound such as tetramethylene diisocyanate, pentamethylene diisocyanate, hexamethylene diisocyanate, heptamethylene diisocyanate, octamethylene diisocyanate, 2,2,4-trimethylhexamethylene diisocyanate, 2,4,4-trimethylhexamethylene diisocyanate, lysinediisocyanato methyl ester, lysine triisocyanate, and xylylene diisocyanate; alicyclic polyisocyanate compounds such as isophorone diisocyanate, bis(isocyanatomethyl)cyclohexane, bis(isocyanatocyclohexyl) methane, dicyclohexyldimethylmethane isocyanate, 2,5-bis(isocyanatomethyl) bicyclo-[2.2.1]-heptane, 2,6-bis(isocyanatomethyl) bicyclo-[2.2.1]-heptane, 3,8-bis(isocyanatomethyl) tricyclodecane, 3,9-bis (isocyanatomethyl)tricyclodecane, 4,8-bis (isocyanatomethyl) ticyclodecane, and 4,9-bis (isocyanatomethyl)tricyclodecane; aromatic polyisocyanate compounds such as tolylene diisocyanate, 4,4'-diphenylmethane diisocyanate, diphenylsulfide-4,4-diisocyanate, and phenylene diisocyanate; heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis (isocyanatomethyl)-1,3-dithiolane; aliphatic polyisothiocyanate compounds such as hexamethylene diisothiocyanate, lysine diisothiocyanate methyl ester, lysine triisothiocyanate, m-xylylene isothiocyanate, bis(isothiocyanatomethyl) sulfide, bis(isothiocyanatoethyl) sulfide, and bis(isothiocyanatoethyl)disulfide; alicyclic polyisocyanate compounds such as isophorone diisothiocyanate, bis (isothiocyanatomethyl)cyclohexane, bis(diisothiocyanatocyclohexyl) methane, cyclohexane diisothiocyanate, methylcyclohexane diisothiocyanate, 2,5-bis(isothiocyanatomethyl) bicyclo-[2.2.1]-heptane, 2,6-bis(isothiocyanatomethyl) bicyclo-[2.2.1]-heptane, 3,8-bis(isothiocyanatomethyl)tricyclodecane, 3,9-bis(isothiocyanatomethyl) tricyclodecane, 4,8-bis(isothiocyanatomethyl) ticyclodecane, and 4,9-bis(isothiocyanatomethyl) tricyclodecane; aromatic polyisothiocyanate compounds such as tolylene diisothiocyanate, 4,4-diphenylmethane diisothiocyanate, and diphenyldisulfide-4,4-diisothiocyanate; and sulfur-containing heterocyclic polyisothiocyanate compounds such as 2,5-diisothiocyanatothiophene, 2,5-bis(isothiocyanatomethyl)thiophene, 2,5-diisothiocyanatotetrahydrothiophene, 2,5-bis(isothiocyanatomethyl) tetrahydrothiophene, 3,4-bis(isothiocyanatomethyl) tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis (isothiocyanatomethyl)-1,3-dithiolane.

Examples of the (thio)epoxy compound include polyepoxy compounds such as bisphenol A diglycidyl ether; Examples of the linear aliphatic 2,3-epoxypropylthio compounds such as bis(2,3-epoxypropyl) sulfide, bis(2,3-epoxypropyl) disulfide, bis(2,3-epoxypropylthio) methane, 1,2-bis (2,3-epoxypropyl) ethane, 1,2-bis(2,3-epoxypropylthio) propane, 1,3-bis(2,3-epoxypropylthio) propane, 1,3-bis(2,3-epoxypropylthio)-2-methyl propane, 1,4-bis(2,3-epoxypropylthio) butane, 1,4-bis(2,3-epoxypropylthio)-2-methyl butane, 1,3-bis(2,3-epoxypropylthio) butane, 1,5-bis(2,3-epoxypropylthio) pentane, 1,5-bis(2,3-epoxypropylthio)-2-methyl pentane, 1,5-bis(2,3-epoxypropylthio)-3-thiapentane, 1,6-bis(2,3-epoxypropylthio) hexane, 1,6-bis(2,3-epoxypropylthio)-2-methyl hexane, 3,8-bis(2,3-epoxypropylthio)-3,6-dithiaoctane, 1,2,3-tris(2,3-epoxypropylthio) propane, 2,2-bis(2,3-epoxypropylthio)-1,3-bis(2,3-epoxypropylthiomethyl) propane, 2,2-bis(2,3-epoxypropylthiomethyl)-1-(2,3-epoxypropylthio) butane, 1,5-bis(2,3-epoxypropylthio)-2-(2,3-epoxypropylthiomethyl)-3-thiapentane, 1,5-bis(2,3-epoxypropylthio)-2,4-bis (2,3-epoxypropylthiomethyl)-3-thiapentane, 1-(2,3-epoxypropylthio)-2,2-bis(2,3-epoxypropylthiomethyl)-4-thiahexane, 1,5,6-tris(2,3-epoxypropylthio)-4-(2,3-epoxypropylthiomethyl)-3-thiahexane, 1,8-bis(2,3-epoxypropylthio)-4-(2,3-epoxypropylthiomethyl)-3,6-dithiaoctane, 1,8-bis(2,3-epoxypropylthio)-4,5-bis(2,3-epoxypropylthiomethyl)-3,6-dithiaoctane, 1,8-bis(2,3-epoxypropylthio)-4,4-bis(2,3-epoxypropylthiomethyl)-3,6-dithiaoctane, 1,8-bis(2,3-epoxypropylthio)-2,5-bis(2,3-epoxypropylthiomethyl)-3,6-dithiaoctane, 1,8-bis(2,3-epoxypropylthio)-2,4,5-tris(2,3-epoxypropylthiomethyl)-3,6-dithiaoctane, 1,1,1-tris[[2-(2,3-epoxypropylthio)ethyl]thiomethyl]-2-(2,3-epoxypropylthio) ethane, 1,1,2,2-tetrakis [[2-(2,3-epoxypropylthio)ethyl]thiomethyl] ethane, 1,11-bis (2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, and 1,11-bis(2,3-epoxypropylthio)-5,7-bis(2,3-epoxypropylthiomethyl)-3,6,9-trithiaundecane; cyclic aliphatic 2,3-epoxypropylthio compounds such as 1,3-bis(2,3-epoxypropylthio) cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[[2-(2,3-epoxypropylthio)ethyl]thiomethyl]-1,4-dithiane, and 2,5-bis(2,3-epoxypropylthiomethyl)-2,5-dimethyl-1,4-dithiane; and aromatic 2,3-epoxypropylthio compounds such as 1,2-bis(2, 3-epoxypropylthio)benzene, 1,3-bis(2,3-epoxypropylthio) benzene, 1,4-bis(2,3-epoxypropylthio)benzene, 1,2-bis(2,3-epoxypropylthiomethyl)benzene, 1,3-bis(2,3-epoxypropylthiomethyl)benzene, 1,4-bis(2,3-epoxypropylthiomethyl)benzene, bis[4-(2,3-epoxypropylthio)phenyl] methane, 2,2-bis[4-(2,3-epoxypropylthio)phenyl] propane, bis[4-(2,3-epoxypropylthio)phenyl] sulfide, bis[4-(2,3-epoxypropylthio)phenyl] sulfone, and 4,4'-bis(2,3-epoxypropylthio) biphenyl.

Examples of the oxetanyl compound include 3-ethyl-3-hydroxymethyl oxetane, 1,4-bis{[(3-ethyl-3-oxetanyl) methoxy]methyl} benzene, 3-ethyl-3-(phenoxymethyl) oxetane, di[1-ethyl-(3-oxetanyl)]methyl ether, 3-ethyl-3-(2-ethylhexyloxymethyl) oxetane, and phenol novolac oxetane.

Examples of the thietanyl compound include 1-{4-(6-mercaptomethylthio)-1,3-dithianylthio}-3-{2-(1,3-dithietanyl)}methyl-7,9-bis(mercaptomethylthio) 2,4,6,10-tetrathiaundecane, 1,5-bis{4-(6-mercaptomethylthio)-1,3-dithianylthio}-3-{2-(1,3-dithietanyl)}methyl-2,4-dithiapentane, 4,6-bis[3-{2-(1,3-dithietanyl)}methyl-5-mercapto-2,4-dithiapentylthio]-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis (mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10, 12,16-hexathiaheptadecane, 3,7-bis{2-(1,3-dithietanyl) }methyl-1,9-dimercapto-2,4,6,8-tetrathianonane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, and 4-{4-(5-mercaptomethylthio-1,3-dithiolanyl)thio}-5-[1-{2-(1,3-dithietanyl)}-3-mercapto-2-thiapropylthio]-1,3-dithiolane.

Examples of the (meth)acryloyl compound include diacryloyl compounds such as ethylene glycol diacrylate, 1,3-butylene glycol diacrylate, 1,4-butanediol diacrylate, 1,6-hexanediol diacrylate, cyclohexanedimethanol diacrylate, alkoxylated hexanediol diacrylate, neopentyl glycol diacrylate, caprolactone modified neopentyl glycol hydroxypivalate diacrylate, cyclohexane dimethanol diacrylate, diethylene glycol diacrylate, dipropylene glycol diacrylate, bisphenol A diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecane dimethanol diacrylate, triethylene glycol diacrylate, and tripropylene glycol diacrylate; triacryloyl compounds such as glycerol triacrylate, ethoxylated trimethylolpropane triacrylate, pentaerythritol triacrylate, propoxylated glyceryl triacrylate, propoxylated trimethylolpropane triacrylate, and tris(2-hydroxyethyl) isocyanurate triacrylate; and tetraacryloyl compounds such as ditrimethylolpropane tetraacrylate, dipentaerythritol pentaacrylate, ethoxylated pentaerythritol tetraacrylate, pentaerythritol tetraacrylate, and caprolactone-modified dipentaerythritol hexaacrylate.

Examples of the (meth)allyl compound include allyl carbonate compounds such as diethylene glycol bisallyl carbonate, dipropylene glycol bisallyl carbonate, triethylene glycol bisallyl carbonate, tetraethylene glycol bisallyl carbonate, neopentyl glycol bisallyl carbonate, 1,3-propanediol bisallyl carbonate, 1,4-butanediol bisallyl carbonate, 1,5-pentanediol bisallyl carbonate, 1,6-hexanediol bisallyl carbonate, and neopentyl glycol bisallyl carbonate, allyl carbonate bodies such as trimethylolpropane, pentaerythritol, diglycerol, ditrimethylolpropane, and dipentaerythritol, (meth)allyl ether compounds such as trimethylolpropane di(meth)allyl ether, pentaerythritol tri(meth)allyl ether, and glycerine mono(meth)allyl ether, (meth)allyl ester compounds such as (meth)allyl acrylate, di(meth)allyl maleate, di(meth)allyl fumarate, and diallyl phthalate, and triallyl isocyanurate.

Examples of the alkene compound include ethylene, propylene, isobutylene, styrene, and divinylbenzene.

Examples of the alkyne compound include hydrocarbon-based alkynes such as 2-butyne, 2-pentyne, 2-hexyne, 3-hexyne, 2-heptyne, 3-heptyne, 2-octyne, 3-octyne, 4-octyne, diisopropyl acetylene, 2-nonyne, 3-nonyne, 4-nonyne, 5-nonyne, 2-decyne, 3-decyne, 4-decyne, 5-decyne, di-tert-butyl acetylene, diphenyl acetylene, dibenzyl acetylene, methyl-iso-propyl acetylene, methyl-tert-butyl acetylene, ethyl-iso-propyl acetylene, ethyl-tert-butyl acetylene, n-propyl-iso-propyl acetylene, n-propyl-tert-butyl acetylene, phenyl methyl acetylene, phenyl ethyl acetylene, phenyl-n-propyl acetylene, phenyl-iso-propyl acetylene, phenyl-n-butyl acetylene, and phenyl-tert-butylacetylene; and alkynyl alcohols such as acetylene diol, propinol, butynol, pentynol, hexynol, hexynediol, heptynol, heptynediol, octynol, and octynediol, and alkynyl amines in which some or all OH groups of the alkynyl alcohols have been substituted with $NH_2$ groups.

Examples of the di- or higher functional active hydrogen compound include a poly(thi)ol compound having two or more hydroxyl groups or mercapto groups, a polyamine compound having two or more amino groups or secondary amino groups, and a polycarboxylic acid compound having two or more carboxyl groups. In addition, a compound having two or more active hydrogen groups selected from a hydroxyl group, a mercapto group, an amino group, a secondary amino group, and a carboxyl group in one molecule can also be exemplified. Two or more active hydrogen groups may be the same as or different from each other.

Among the poly(thi)ol compounds (here, alcohol used as a solvent is not included), examples of the polyol compound include aliphatic polyols such as ethylene glycol, diethylene glycol, propylene glycol, dipropylene glycol, tripropylene glycol, butylene glycol, neopentyl glycol, glycerin, trimethylol ethane, trimethylol propane, ditrimethylol propane, butanetriol, 1,2-methyl glucoside, pentaerythritol, dipentaerythritol, tripentaerythritol, sorbitol, erythritol, threitol, ribitol, arabinitol, xylitol, allitol, mannitol, dulcitol, iditol, glycol, inositol, hexanetriol, triglycerose, diglylperol, triethylene glycol, polyethylene glycol, tris(2-hydroxyethyl) isocyanurate, cyclobutanediol, cyclopentane diol, cyclohexane diol, cycloheptane diol, cyclooctane diol, cyclohexane dimethanol, hydroxypropyl cyclohexanol, tricyclo[$5.2.1.0^{2,6}$]decane-dimethanol, bicyclo[4.3.0]-nonanediol, dicyclohexanediol, tricyclo[5.3.1.1]dodecanediol, bicyclo[4.3.0] nonanedimethanol, tricyclo[5.3.1.1] dodecane-diethanol, hydroxypropyl tricyclo[5.3.1.1]dodecanol, spiro[3.4]octanediol, butyl cyclohexanediol, 1,1'-bicyclohexylidenediol, cyclohexanetriol, maltitol, and lactose; aromatic polyols such as dihydroxynaphthalene, trihydroxynaphthalene, tetrahydroxynaphthalene, dihydroxybenzene, benzenetriol, biphenyl tetraol, pyrogallol, (hydroxynaphthyl) pyrogallol, trihydroxyphenanthrene, bisphenol A, bisphenol F, xylylene glycol, di(2-hydroxyethoxy)benzene, bisphenol A-bis-(2-hydroxyethylether), tetrabromobisphenol A, and tetrabromobisphenol A-bis-(2-hydroxyethylether); halogenated polyols such as dibromoneopentyl glycol; and polymeric polyols such as an epoxy resin. In one embodiment, at least one type selected from these can be used in combination.

Additionally, examples of the polyol compound include fused reaction products of an organic acid such as oxalic acid, glutamic acid, adipic acid, acetic acid, propionic acid, cyclohexanecarboxylic acid, fÀ-oxocyclohexanepropionic acid, dimer acid, phthalic acid, isophthalic acid, salicylic acid, 3-bromopropionic acid, 2-bromoglycol, dicarboxycyclohexane, pyromellitic acid, butanetetracarboxylic acid, or bromophthalic acid with the above-described polyols; addition reaction products of the above-described polyols with an alkylene oxide such as ethylene oxide or propylene oxide; addition reaction product of an alkylenepolyamine with an alkylene oxide such as ethylene oxide or propylene oxide; bis-[4-(hydroxymethyl)phenyl] sulfide, bis-[4-(2-hydroxypropoxy)phenyl] sulfide, bis-[4-(2,3-dihydroxypropoxy) phenyl] sulfide, bis-[4-(4-hydroxycyclohexyloxy)phenyl] sulfide, bis-[2-methyl-4-(hydroxyethoxy)-6-butylphenyl] sulfide, and compounds obtained by adding three or less molecules on average of ethylene oxide and/or propylene oxide per hydroxyl group to these compounds; and polyols containing a sulfur atom such as di-(2-hydroxyethyl) sulfide, 1,2-bis-(2-hydroxyethylmercapto) ethane, bis(2-hydroxyethyl)disulfide, 1,4-dithiane-2,5-diol, bis(2,3-dihydroxypropyl) sulfide, tetrakis(4-hydroxy-2-thiabutyl) methane, bis(4-hydroxyphenyl) sulfone (bisphenol S), tetrabromobisphenol S, tetramethyl bisphenol S, 4,4'-thiobis(6-tert-butyl-3-methylphenol), and 1,3-bis(2-hydroxyethylthioethyl)-cyclohexane. In one embodiment, at least one type selected from these can be used in combination.

Examples of the polythiol compound include aliphatic polythiol compounds such as methanedithiol, 1,2-ethanedithiol, 1,2,3-propanetrithiol, 1,2-cyclohexanedithiol, bis(2-mercaptoethyl) ether, tetrakis(mercaptomethyl) methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl) sulfide, bis(mercaptomethyl)disulfide, bis(mercaptoethyl) sulfide, bis(mercaptoethyl)disulfide, bis(mercaptopropyl) sulfide, bis(mercaptomethylthio) methane, bis(2-mercaptoethylthio) methane, bis(3-mercaptopropylthio) methane, 1,2-bis(mercaptomethylthio) ethane, 1,2-bis(2-mercaptoethylthio) ethane, 1,2-bis(3-mercaptopropylthio) ethane, 1,2,3-tris(mercaptomethylthio) propane, 1,2,3-tris (2-mercaptoethylthio) propane, 1,2,3-tris(3-mercaptopropylthio) propane, 4-mercaptomethyl-1,8-dimercapto-3,6-dithiaoctane, 5,7-mercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis (mercaptomethylthiomethyl) methane, tetrakis(2-mercaptoethylthiomethyl) methane, tetrakis(3-mercaptopropylthiomethyl) methane, bis(2,3-mercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, and esters of these thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3- mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethylester), thiodipropionic acid bis(2-mercaptoethylester), dithiodiglycolic acid bis(2-mercaptoethyl ester), dithiodipropionic acid bis(2-mercaptoethylester), 1,1,3,3-tetrakis(mercaptomethylthio) propane, 1,1,2,2-tetrakis(mercaptomethylthio) ethane, 4,6-bis(mercaptomethylthio)-1,3-dithiane, tris(mercaptomethylthio) methane, and tris(mercaptoethylthio) methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl) benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophene dithiol, bismuthiol, 4,6-bis(mercaptomethylthio)-1,3-dithiane, and 2-(2,2-bis(mercaptomethylthio)ethyl)-1,3-dithietane.

Examples of the polyamine compound include primary polyamine compounds such as ethylene diamine, 1,2-, or 1,3-diaminopropane, 1,2-, 1,3-, or 1,4-diaminobutane, 1,5-diaminopentane, 1,6-diaminohexane, 1,7-diaminoheptane, 1,8-aminooctane, 1,10-diaminodecane, 1,2-, 1,3-, or 1,4-diaminocyclohexane, o-, m- or p-diaminobenzene, 3,4- or 4,4'-diaminobenzophenone, 3,4- or 4,4'-diaminodiphenyl ether, 4,4'-diaminodiphenylmethane, 4,4'-diaminodiphenylsulfide, 3,3'- or 4,4'-diaminodiphenylsulfone, 2,7-aminofluorene, 1,5-, 1,8-, or 2,3-diaminonaphthalene, 2,3-, 2,6-, or 3,4-diaminopyridine, 2,4- or 2,6-diaminotoluene, m-, or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine; monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, and tetramethylguanidine.

Examples of the polycarboxylic acid compound include succinic acid, adipic acid, sebacic acid, azelaic acid, dodecanedioic acid, terephthalic acid, isophthalic acid, orthophthalic acid, phthalic anhydride, tetrahydrophthalic acid, hexahydrophthalic acid, naphthalene dicarboxylic acid, biphenyl dicarboxylic acid, dimer acid, trimellitic acid, pyromellitic acid, and fÃ-caprolactone.

Examples of the acid anhydride include succinic anhydride, phthalic anhydride, maleic anhydride, tetrabromophthalic anhydride, tetrahydrophthalic anhydride, trimellitic anhydride, and dodecylsuccinic anhydride.

The above polymerization reactive compounds may be used alone or two or more types thereof may be used in combination.

The polymerization reactive compound included in the composition of one embodiment will be described in more detail below. The polymerization reactive compound can be classified into (Group A) and (Group B) according to reactivity.

(Group A): a polyiso(thio)cyanate compound, a (thio)epoxy compound, an oxetanyl compound, a thietanyl compound, a (meth)acryloyl compound, an alkene compound, or an alkyne compound can be classified into (Group A) as a self-polymerizable or copolymerizable compound. Here, the following (Group B) is not included in (Group A).

(Group B): a di- or higher functional active hydrogen compound which is a poly(thi)ol compound, a polyamine compound, or a polycarboxylic acid compound, or an acid anhydride can be classified into (Group B) as an addition-polymerizable compound. Here, the above (Group A) is not included in (Group B).

In a case where the polymerization reactive compound is used alone, any one type selected from (Group A) or (Group B) is selected. In a case where the polymerization reactive compound is used alone (one type), one type selected from (Group A) which is a self-polymerizable or copolymerizable compound is more easily cured than one type selected from (Group B) which is an addition-polymerizable compound, and thus this is preferable.

In a case where two or more polymerization reactive compounds are used, a method of mixing two or more types selected from only (Group A), two or more types selected from only (Group B), or one or more types selected from (Group A) and one or more types selected from (Group B) can be exemplified.

In one embodiment, as a polymerization reactive compound, a polyiso(thio)cyanate compound in (Group A), and a di- or higher functional active hydrogen compound in (Group B) can be used.

The polyiso(thio)cyanate compound classified into a self-polymerizable or copolymerizable compound tends to have lower self-polymerizability than other compounds classified into (Group A) or lower reactivity of copolymerization with (Group A) compounds, and if selecting conditions, a self-polymerization reaction type polymer such as a 1-nylon type polymer or an isocyanurate type polymer is obtained in some cases. Also in the copolymerization with a (thio)epoxy compound, an ethylene carbonate type copolymerization polymer is obtained in some cases.

Even in the case of selecting two or more types from only the addition-polymerizable (Group B), in general, polymerization is difficult, but in a case where an acid anhydride and a poly(thi)ol compound are used in combination, in a case where an acid anhydride and a polyamine compound are used in combination, or in a case where three types of acid anhydride, poly(thi)ol compound, and polyamine compound are used in combination, there is a tendency that polymerization reaction is likely to proceed, and a curable resin is obtained. The blending ratio between acid anhydride and poly(thi)ol or polyamine is within a range of about 8/2 to 2/8, preferably within a range of 6/4 to 4/6, and more preferably within a range of range of 55/45 to 45/55, in the functional group molar ratio of the acid anhydride group of an acid anhydride/the mercapto group of poly(thi)ol (or amino group of polyamine).

The blending ratio in a case where both (Group A) and (Group B) are used is within a range of about 999/1 to 1/9, preferably within a range of 99/1 to 10/90, more preferably within a range of 9/1 to 3/7, and most preferably within a range of 7/3 to 4/6, when expressed in the functional group molar ratio of the polymerizable functional group of (Group A)/the polymerizable functional group of (Group B).

With respect to 100 parts by weight of the polymerization reactive compound (c), the polymerizable composition for optical materials of one embodiment may contain 0.01 to 50 parts by weight of the polyester polyol (a), preferably 0.05 to 20 parts by weight, and more preferably 0.1 to 10 parts by weight of the polyester polyol (a), and may contain 0.0001 to 5 parts by weight of the compound (b), preferably 0.001 to 1 part by weight, and more preferably 0.005 to 0.5 parts by weight. These numerical ranges may be appropriately combined.

By containing the polyester polyol (a) in the range described above, the photochromic fading speed and the heat resistance are improved.

In one embodiment of the present application, the compound (c) does not include a polyamine compound having one or more amino groups or secondary amino groups. In another embodiment of the present application, the compound (c) does not include a polycarboxylic acid compound having one or more carboxyl groups. In still another embodiment of the present application, the compound (c) does not include a polyamine compound having one or more amino groups or secondary amino groups, and a polycarboxylic acid compound having one or more carboxyl groups.

In one embodiment of the present application, the compound (c) does not include a polyamine compound having two or more amino groups or secondary amino groups. In another embodiment of the present application, the compound (c) does not include a polycarboxylic acid compound having two or more carboxyl groups. In still another embodiment of the present application, the compound (c) does not include a polyamine compound having two or more amino groups or secondary amino groups, and a polycarboxylic acid compound having two or more carboxyl groups.

(Other Components such as Additives)

The polymerizable composition of one embodiment may include components other than the polymerization reactive compound described above. Examples thereof include a monofunctional iso(thio)cyanate compound, a monofunctional (thio)epoxy compound, a monofunctional oxetanyl compound, a monofunctional thietanyl compound, a monofunctional (meth)acryloyl compound having one functional group arbitrarily selected from a methacryloyloxy group, an acryloyloxy group, a methacryloylthio group, an acryloylthio group, a methacrylamide group, and an acrylamide group, a monofunctional alkene compound having one polymerizable carbon-carbon double bond other than a methacryloyloxy group, an acryloyloxy group, a methacryloyloxythio group, an acryloylthio group, a methacrylamide group, and an acrylamide group, a monofunctional alcohol compound other than alcohols used as a solvent, a monofunctional thiol compound, a monofunctional amine compound having one functional group arbitrarily selected from an amino group and a secondary amino group, a monofunctional carboxylic acid compound having one carboxyl group, a solvent, and water.

In the process for producing a molded body by cast-polymerizing the composition of one embodiment, as necessary, in the case of being cured by heat, a polymerization catalyst or a thermal polymerization initiator is added, and in the case of being cured by radiation other than infrared rays (heat), such as ultraviolet rays, a photopolymerization initiator is added.

Examples of the polymerization catalyst include Lewis acid, amine, a tertiary amine compound and an inorganic acid salt or an organic acid salt thereof, a metal compound, a quaternary ammonium salt, and an organic sulfonic acid.

The amount of polymerization catalyst used is preferably within a range of 5 ppm to 15% by weight, more preferably within a range of 10 ppm to 10% by weight, and still more preferably within a range of 50 ppm to 3% by weight, with respect to the polymerizable composition.

Examples of the metal compound used as a polymerization catalyst include dimethyl tin chloride, dibutyl tin chloride, and dibutyl tin laurate.

Examples of the thermal polymerization initiator used include ketone peroxide compounds such as methyl isobutyl ketone peroxide and cyclohexanone peroxide; diacyl peroxide compounds such as isobutyryl peroxide, o-chlorobenzoyl peroxide, and benzoyl peroxide; dialkyl peroxide compounds such as tris(t-butylperoxy)triazine and t-butyl cumyl peroxide; peroxyketal compounds such as 1,1-di(t-hexylperoxy)cyclohexane, 2,2-bis(4,4-di-t-butylperoxycyclohexyl) propane, and 2,2-di(t-butylperoxy) butane; alkyl perester compounds such as $f_i$-cumylperoxyneodecanoate, t-butylperoxypivalate, 2,4,4-trimethylphenylperoxy-2-ethyl hexanoate, t-butylperoxy-2-ethyl hexanoate, and t-butylperoxy-3,5,5-trimethyl hexanoate; and peroxycarbonate compounds such as di-3-methoxybutyl peroxydicarbonate, bis(4-t-butylcyclohexyl) peroxydicarbonate, t-butyl peroxyisopropyl carbonate, and diethylene glycol bis(t-butylperoxycarbonate).

Examples of the photopolymerization initiator used include a photoradical polymerization initiator, a photocationic polymerization initiator, and a photoanionic polymerization initiator, and among these photopolymerization initiators, a photoradical polymerization initiator is preferable.

Examples of the photoradical polymerization initiator include IRGACURE(R) 127 (manufactured by BASF(R) Corp.), IRGACURE(R) 651 (manufactured by BASF(R) Corp.), IRGACURE(R) 184 (manufactured by BASF(R) Corp.), Darocure 1173 (manufactured by BASF(R) Corp.), benzophenone, 4-phenyl benzophenone, IRGACURE(R) 500 (manufactured by BASF(R) Corp.), IRGACURE(R) 2959 (manufactured by BASF(R) Corp.), IRGACURE(R) 907 (manufactured by BASF(R) Corp.), IRGACURE(R) 369 (manufactured by BASF(R) Corp.), IRGACURE(R) 1300 (manufactured by BASF(R) Corp.), IRGACURE(R) 819 (manufactured by BASF(R) Corp.), IRGACURE(R) 1800 (manufactured by BASF(R) Corp.), Darocure TPO (manufactured by BASF(R) Corp.), Darocure 4265 (manufactured by BASF(R) Corp.), IRGACURE(R) OXE01 (manufactured by BASF(R) Corp.), IRGACURE(R) OXE02 (manufactured by BASF(R) Corp.), ESACURE(R) KT55 (manufactured by Lamberti S.p.A.), ESACURE(R) ONE (manufactured by Lamberti S.p.A.), ESACURE(R) KIP150 (manufactured by Lamberti S.p.A.), ESACURE(R)

KIP100F (manufactured by Lamberti S.p.A.), ESACURE (R) KT37 (manufactured by Lamberti S.p.A.), ESACURE (R) KT046 (manufactured by Lamberti S.p.A.), ESACURE (R) 1001M (manufactured by Lamberti S.p.A.), ESACURE (R) KIP/EM (manufactured by Lamberti S.p.A.), ESACURE(R) DP250 (manufactured by Lamberti S.p.A.), ESACURE(R) KB1 (manufactured by Lamberti S.p.A.), and 2,4-diethyl thioxanthone.

Among these photoradical polymerization initiators, IRGACURE(R) 127 (manufactured by BASF(R) Corp.), IRGACURE(R) 184 (manufactured by BASF(R) Corp.), Darocur 1173 (manufactured by BASF(R) Corp.), IRGACURE(R) 500 (manufactured by BASF(R) Corp.), IRGACURE(R) 819 (manufactured by BASF(R) Corp.), Darocur TPO (manufactured by BASF(R) Corp.), ESACURE(R) ONE (manufactured by Lamberti S.p.A.), ESACURE(R) KIP100F (manufactured by Lamberti S.p.A.), ESACURE (R) KT37 (manufactured by Lamberti S.p.A.), or ESACURE(R) KT046 (manufactured by Lamberti S.p.A.) is preferable.

Examples of the photocationic polymerization initiator include IRGACURE(R) 250 (manufactured by BASF(R) Corp.), IRGACURE(R) 784 (manufactured by BASF(R) Corp.), ESACURE(R) 1064 (manufactured by Lamberti S.p.A.), CYRAURE UVI6990 (manufactured by Union Carbide Corporation Japan), ADEKA(R) OPTOMER SP-172 (manufactured by ADEKA(R) CORPORATION), ADEKA (R) OPTOMER SP-170 (manufactured by ADEKA(R) CORPORATION), ADEKA(R) OPTOMER SP-152 (manufactured by ADEKA(R) CORPORATION), and ADEKA(R) OPTOMER SP-150 (manufactured by ADEKA(R) CORPORATION).

In a case where the above-described photopolymerization initiator is used, a photopolymerization accelerator may be used in combination. Examples of the photopolymerization accelerator include 2,2-bis(2-chlorophenyl)-4,5'-tetraphenyl-2'H-<1,2'>biimidazolyl, tris(4-dimethylaminophenyl) methane, 4,4'-bis(dimethylamino)benzophenone, 2-ethylanthraquinone, and camphorquinone.

The amount of the photopolymerization initiator and the thermal polymerization initiator used is preferably within a range of 0.1% to 20% by weight, more preferably within a range of 0.5% to 10% by weight, and still more preferably within a range of 1% to 5% by weight, in the polymerizable composition. In the process for producing a molded body by cast-polymerizing the composition of one embodiment, as necessary, an internal mold release agent may be added.

An acidic phosphoric ester can be used as the internal mold release agent. Examples of the acidic phosphoric ester include a phosphoric monoester and a phosphoric diester, and the acidic phosphoric ester can be used alone or in a mixture of two or more types thereof. The acidic phosphoric ester used as the internal mold release agent can be represented by General Formula (3).

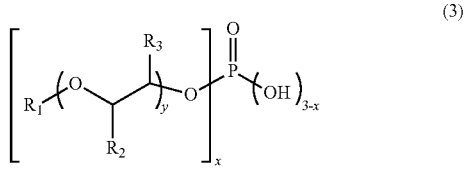

(3)

In General Formula (3), x represents an integer of 1 or 2, y represents an integer of 0 to 18, $R_1$ represents an alkyl group having 1 to 20 carbon atoms, and $R_2$ and $R_3$ each independently represent a hydrogen atom, a methyl group, or an ethyl group. The number of carbon atoms in [ ]x is preferably 4 to 20. A plurality of $R_1$'s may be the same as or different from each other, a plurality of $R_2$'s may be the same as or different from each other, or a plurality of $R_3$'s may be the same as or different from each other.

As $R_1$ in General Formula (3), an organic residue derived from a linear aliphatic compound such as methane, ethane, propane, butane, pentane, hexane, heptane, octane, nonane, decane, undecane, dodecane, tetradecane, or hexadecane, an organic residue derived from a branched aliphatic compound such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, or 4-propyloctane, and an organic residue derived from an alicyclic compound such as cyclopentane, cyclohexane, 1,2-dimethyl cyclohexane, 1,3-dimethyl cyclohexane, and 1,4-dimethyl cyclohexane can be exemplified, and at least one type selected from these can be used. Moreover, the present invention is not limited to these exemplary compounds. As the acidic phosphoric ester, at least one type or a mixture of two or more types can be used.

In General Formula (3), y is preferably 0 or 1. In a case where y is 0, $R_1$ is preferably a linear or branched alkyl group having 4 to 12 carbon atoms, and more preferably a linear alkyl group having 4 to 12 carbon atoms. In a case where y is 1, $R_1$ is preferably a linear or branched alkyl group having 1 to 20 carbon atoms, and preferably a linear or branched alkyl group having 3 to 12 carbon atoms. The acidic phosphoric ester can be used as one type or a mixture of two or more types selected from these.

As the acidic phosphoric ester, ZELEC(R)UN (manufactured by STEPAN(R) Company), an internal mold release agent for MR (manufactured by Mitsui Chemicals, Inc.), JP series manufactured by JOHOKU CHEMICAL CO., LTD., Phosphanol series manufactured by TOHO Chemical Industry Co., Ltd., or AP and DP Series manufactured by DAI-HACHI CHEMICAL INDUSTRY CO., LTD. can be used, and ZELEC(R)UN (manufactured by STEPAN(R) Company) or an internal mold release agent for MR (manufactured by Mitsui Chemicals, Inc.) is more preferable.

To prevent changing in quality even in a case where a molded body formed of the curable resin of one embodiment is exposed to the outside for a long period of time, it is desirable that by further adding an ultraviolet absorbent and a hindered amine-based stabilizer to the composition, a composition at which weather resistance is imparted is obtained.

The ultraviolet absorbent is not particularly limited, and for example, various ultraviolet absorbents such as a benzotriazole-based ultraviolet absorbent, a triazine-based ultraviolet absorbent, a benzophenone-based ultraviolet absorbent, a benzoate-based ultraviolet absorbent, a propanedioic acid ester-based ultraviolet absorbent, and an oxanilide-based ultraviolet absorbent can be used.

Specific examples thereof include benzotriazole-based ultraviolet absorbents such as 2-(2H-benzotriazol-2-yl)-4-methyl-6-(3,4,5,6-tetrahydrophthalibizylmethyl)phenol, 2-(2H-benzotriazol-2-yl)-p-cresol, 2-(2H-benzotriazol-2-yl)-4-tert-butylphenol, 2-(2H-benzotriazol-2-yl)-4,6-di-tert-butylphenol, 2-(2H-benzotriazol-2-yl)-4,6-bis(1-methyl-1-phenylethyl)phenol, 2-(2H-benzotriazol-2-yl)-4-(1,1,3,3-tetramethylbutyl)-6-(1-methyl-1-phenylethyl)phenol, 2-(2H-benzotriazol-2-yl)-4-(3-one-4-oxa-dodecyl)-6-tertbutyl-phenol, 2-{5-chloro(2H)-benzotriazol-2-yl}-4-(3-one-4-oxa-dodecyl)-6-tert-butyl-phenol, 2-{5-chloro(2H)-benzotriazol-2-yl}-4-methyl-6-tert-butyl-phenol, 2-(2H-benzotriazol-2-yl)-4,6-di-tert-pentyl phenol, 2-{5-chloro (2H)-benzotriazol-2-yl}-4,6-di-tert-butylphenol, 2-(2H-benzotriazol-2-yl)-4-tert-octylphenol, 2-(2H-benzotriazole-2-yl)-4-methyl-6-n-dodecylphenol, octyl 3-[3-tert-butyl-5-(5-chloro-2H-benzotriazol-2-yl)-4-hydroxyphenyl] propionate, 2-ethylhexyl 3-[3-tert-butyl-5-(5-chloro-2H-benzotriazol-2-yl)-4-hydroxyphenyl] propionate, methyl-3-{3-(2H-benzotriazol-2-yl)-5-tert-butyl-4-hydroxyphenyl}propionate, a reaction product of polyethylene glycol 300, product name Viosorb583 (manufactured by KYODO CHEMICAL CO., LTD.), product name TINUVIN(R) 326 (manufactured by BASF(R) Corp.), product name TINUVIN(R) 384-2 (manufactured by BASF (R) Corp.), product name TINUVIN(R) PS (manufactured by BASF(R) Corp.), product name SEESORB(R)706 (manufactured by SHIPRO KASE KAISHA LTD.), and product name EVERSORB(R)109 (manufactured by Everlight Chemical Industrial Corp.); triazine-based ultraviolet absorbents such as 2-(4-phenoxy-2-hydroxy-phenyl)-4,6-diphenyl-1,3,5-triazine, 2-(2-hydroxy-4-oxa-hexadesiloxy)-4,6-di(2,4-dimethyl-phenyl)-1,3,5-triazine, 2-(2-hydroxy-4-oxa-heptadesiloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, product name TINUVIN (R) 400 (manufactured by BASF(R) Corp.), product name TINUVIN(R) 405 (manufactured by BASF(R) Corp.), product name TINUVIN(R) 460 (manufactured by BASF(R) Corp.), and product name TINUVIN(R) 479 (manufactured by BASF(R) Corp.); benzophenone-based ultraviolet absorbents such as 2-hydroxy-4-n-methoxybenzophenone and 2-hydroxy-4-n-octoxybenzophenone; benzoate-based ultraviolet absorbents such as 2,4-di-tert-butylphenyl-3,5-di-tert-butyl-4-hydroxybenzoate; propanedioic acid ester-based ultraviolet absorbents such as propanedioic acid-{(4-methoxyphenyl)-methylene}-dimethyl ester, product name Hostavin PR-25 (manufactured by Clariant Japan K.K.), and product Name Hostavin B-CAP (manufactured by Clariant Japan K.K.); and oxanilide-based ultraviolet absorbents such as 2-ethyl-2'-ethoxy-oxanilide and product Name Sanduvor VSU (manufactured by Clariant Japan K.K.). Among these ultraviolet absorbents, benzotriazole-based ultraviolet absorbents or triazole-based ultraviolet absorbents are preferable.

In addition to the compound (b) that will be described below, materials contained inside the nanodomain separation structural body constituted from the polyester polyol (a) may be added to the composition. Examples of such materials include metal fine particles. The nanodomain separation structural body can also act as a dispersant for a substance which is likely to be aggregated in a composition.

In some cases, the polymerizable composition for optical materials of one embodiment includes a partially formed nanodomain separation structural body of the polyester polyol (a) depending on the preparation condition.
<Production Method of Polymerizable Composition for Optical Materials>

Specifically, the polymerizable composition for optical materials of one embodiment can be produced by mixing and stirring the polyester polyol (a), the compound (b) of which light absorption characteristics vary by sensing changes in environment, the polymerization reactive compound (c), and a catalyst, an internal mold release agent, and other additives used as necessary. Depressurization and defoaming may be performed as necessary. The temperature at the time of mixing is typically 25 degree C. or lower. There are cases in which the temperature is preferably a lower temperature from the viewpoint of a pot life of the polymerizable composition for optical materials. Here, in a case where the solubility of the catalyst, the internal mold release agent, and the additives in the polymerization reactive compound (c) are not good, it is also possible to dissolve them by heating any of them in the polymerization reactive compound (c) in advance.

Polymer particles containing the compound (b) are prepared from the polyester polyol (a) in a predetermined solvent and the compound (b) of which light absorption characteristics vary by sensing changes in specific environment factors in advance, and after the polymerization reactive compound (c) is mixed therewith, by distilling off the solvent under reduced pressure, a polymerizable composition for optical materials may be prepared.

In addition, it is also possible that two or more compounds are used as the polymerization reactive compound (c), some of the polyester polyol (a), the compound (b), and the polymerization reactive compound (c) are mixed, and then, the remaining polymerization reactive compound (c) is mixed with the obtained mixture.

In some cases, the polymerizable composition for optical materials of one embodiment includes a partially formed nanodomain separation structural body of the polyester polyol (a) depending on the preparation condition.
<Cured Body>

A cured body can be obtained by polymerizing and curing the polymerizable composition for optical materials of one embodiment. The cured body can include the nanodomain separation structural body of the polyester polyol (a), the compound (b) of which light absorption characteristics vary by sensing changes in environment; and the resin formed by polymerization of the polymerization reactive compound (c). Because of the highly cross-linked matrices of polymerization reactive compound (c), the compound (b) may not operate well. The present inventors have envisioned the encapsulation of the compound (b) into a nanodomain made of a flexible polymeric matrix. The nanodomain would be able to disperse and stabilize the dyes, and to make them more functional. As the nanodomain separation structural body, polymer particles having a separation structure, configured of the polyester polyol (a) is used. A cured body including a separation structural body can provide an optical material which is excellent in photochromic characteristics, heat resistance, and mechanical properties.

At least some of the compound (b) may be contained inside the nanodomain separation structural body configured of the polyester polyol (a), and in this case, the above-described effects are particularly excellent. The volume 50% average particle diameter of the polymer particles which are separation structural bodies is 1 nm to 1,000 nm. The structure can be confirmed by a transmission electron microscope.
(Nanodomain Separation Structure)

Figure 2:
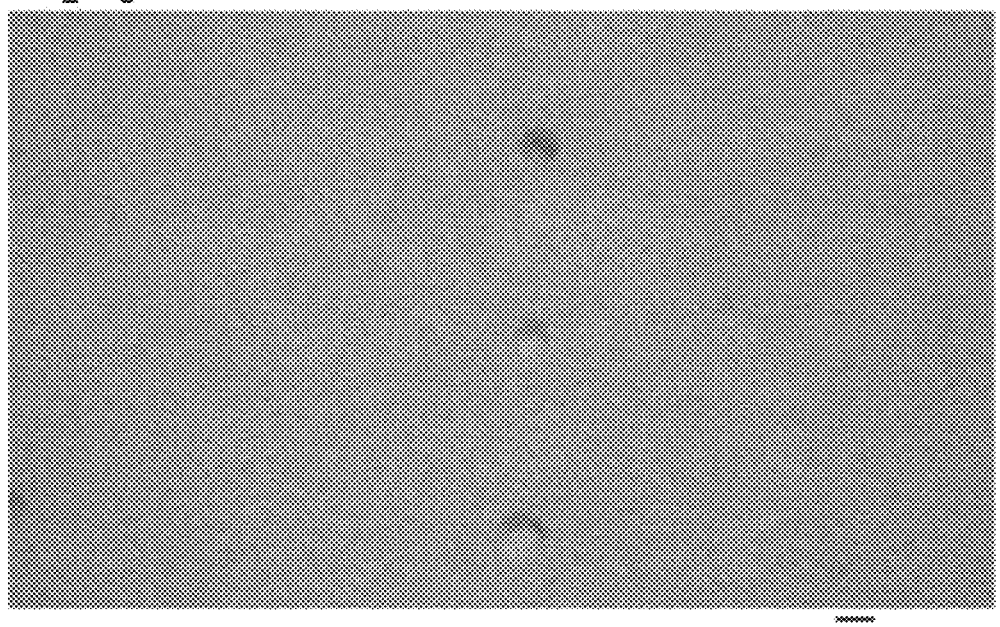
FIG. 2 is a cross sectional TEM picture of nanodomain separation structural body made of polycaprolactone diol from example a7.

The nanodomain separation structure is described as aggregation of polycaprolactone polyols to make nano-sized particles. Depending on the structure of the polycaprolactone polyols, the nanoparticles can be seen by TEM image as a spherical shape nano-sized objects (FIGS. 1 and 2). By including the nanodomain separation structural body such as polymer particles having a nanodomain separation structure, it is possible to obtain a transparent cured body with low turbidity. Due to the effect obtained by the presence of the nanodomain separation structure on the functionality of the compound (b), it is believed that the compound (b) is preferentially, or at least partially, located inside the nanodomain separation structure.

The production method of the cured body of one embodiment includes a step of polymerizing and curing the above-described polymerizable composition for optical materials. By the step, specifically, a resin is formed by polymerization of the polymerization reactive compound (c); the polyester polyol (a) forms a nanodomain separation structural body; and a cured body formed of the resin, the nanodomain separation structural body, and the compound (b) is formed.

In the step, by heating or irradiating with radiation such as ultraviolet rays or the like other than infrared rays, and the polymerizable composition for optical materials is polymerized and cured, whereby a cured body can be obtained. The polymerization conditions are suitably selected.

<Molded Body>

The resin obtained by heat-polymerizing the composition of one embodiment and the molded body formed of the resin are produced by adding a polymerization reactive compound and as necessary, various additives described above. In addition, a polymerization reactive compound and an additive which are not described in the present application may be added to the composition of any embodiment within a range not impairing the effects of the embodiment. The molded body of one embodiment includes the nanodomain separation structural body of the polyester polyol (a), similarly to the cured body.

As the resin configuring the molded body of one embodiment, resins obtained from a liquid polymerizable composition of which casting work is easy are preferable, and among these resins, resins described as the following (a) to (z) are preferable.

(a) a poly(thio)urethane resin obtained by polymerization of a polyiso(thio)cyanate compound and a poly(thi)ol compound, in the present application, a poly(thio)urethane resin means a polyurethane resin, a polythiourethane resin, or a polydithiourethane resin;

(b) a poly(thio)urea resin obtained by polymerization of a polyisocyanate compound or a polyisothiocyanate compound and a polyamine compound, in the present application, a poly(thio)urea resin means a polyurea resin or a polythiourea resin;

(c) a poly(thio)epoxy resin obtained by polymerization of a (thio)epoxy compound;

(d) a poly(thio)epoxy-poly(thi)ol resin obtained by polymerization of a (thio)epoxy compound and a poly(thi)ol compound;

(e) a poly(thio)epoxy-polyamine resin obtained by polymerization of a (thio)epoxy compound and a polyamine compound;

(f) a poly(thio)epoxy-acid anhydride resin obtained by polymerization of a (thio)epoxy compound and an acid anhydride;

(g) a poly(meth)acryloyl resin obtained by polymerization of a (meth)acryloyl compound;

(h) a poly(meth)acryloyl-poly(thi)ol resin obtained by polymerization of a (meth)acryloyl compound and a poly(thi)ol compound;

(i) a poly(meth)acryl-polyalkene resin obtained by polymerization of a (meth)acryloyl compound and an alkene compound;

(j) a poly(meth)acryl-polyalkyne resin obtained by polymerization of a (meth)acryloyl compound and an alkyne compound;

(k) a poly(meth)acryl-polyamine resin obtained by polymerization of a (meth)acryloyl compound and a polyamine compound;

(l) a polyalkene resin obtained by polymerization of an alkene compound;

(m) a polyalkene-poly(thi)ol resin obtained by polymerization of an alkene compound and a poly(thi)ol compound;

(n) a polyalkene-polyamine resin obtained by polymerization of an alkene compound and a polyamine compound;

(o) a polyalkyne resin obtained by polymerization of an alkyne compound;

(p) a polyalkyne-poly(thi)ol resin obtained by polymerization of an alkyne compound and a poly(thi)ol compound;

(q) a polyalkyne-polyamine resin obtained by polymerization of an alkyne compound and a polyamine compound;

(r) a polyalkyne-polyalkene resin obtained by polymerization of an alkyne compound and an alkene compound;

(s) a polyoxetanyl resin obtained by polymerization of an oxetanyl compound;

(t) a polyoxetanyl-poly(thi)ol resin obtained by polymerization of an oxetanyl compound and a poly(thi)ol compound;

(u) a polyoxetanyl-polyamine resin obtained by polymerization of an oxetanyl compound and a polyamine compound;

(v) a polyoxetanyl-acid anhydride resin obtained by polymerization of an oxetanyl compound and an acid anhydride;

(w) a polythietanyl-poly(thi)ol resin obtained by polymerization of a thietanyl compound and a poly(thi)ol compound;

(x) a polythietanyl-polyamine resin obtained by polymerization of a thietanyl compound and a polyamine compound;

(y) a polythietanyl-acid anhydride resin obtained by polymerization of a thietanyl compound and an acid anhydride; and (z) mixed resins obtained by copolymerization of two or more selected from (a) to (y).

Among the resins of the above-described (a) to (z), as more preferable resins, the resins described in (a) to (i) and (s) to (z) and mixed resins thereof (a mixture of a copolymer and a resin) are exemplified, and as still more preferable resins, the resins described in (a) to (f), (s) to (v), and (z) and mixed resins thereof are exemplified.

<Molded Body and Application Thereof>

In one embodiment, by changing the mold shape when polymerizing the polymerizable composition for optical materials as described above, molded bodies having various shapes and optical materials formed of the molded bodies can be obtained. The molded body of the embodiment can be molded in a desired shape, and can be used as various optical materials by providing a coating layer formed as necessary, other members, or the like.

Examples of the optical materials include a plastic lens, a light emitting diode (LED), a prism, an optical fiber, an information recording substrate, and a filter. A plastic lens is particularly suitable.

The plastic lens formed of the molded body of one embodiment will be described below. The plastic lens can be produced in the following manner.

<Production Method of Plastic Lens>

The plastic lens of one embodiment is typically produced by a cast polymerization method using the polymerizable composition for optical materials described above. The production method of the plastic lens of one embodiment includes, specifically, a step of forming a lens substrate by cast-polymerizing the polymerizable composition for optical materials.

In the step, by injecting the obtained composition of the embodiment into a cavity formed of a glass mold and a gasket or a tape and by heating or irradiating with radiation such as ultraviolet rays or the like other than infrared rays to polymerize and cure the composition, a resin of the embodiment and a plastic lens substrate formed of the resin are produced. By the step, a resin is formed by polymerization of the polymerization reactive compound (c), the polyester polyol (a) forms a nanodomain separation structural body, and it is possible to obtain a plastic lens substrate formed of the resin, the nanodomain separation structural body, and the compound (b).

In a case where a curable resin of one embodiment and a plastic lens formed of the resin are produced by heating, for the purpose of preventing polymerization uniformity (striae) by convection, typically, polymerization is conducted by slowly heating from a low temperature.

Since polymerization conditions significantly vary depending on the types and amounts of polymerizable composition for optical materials and the catalyst used, the shape of the mold, and the like, the polymerization conditions are not limited, but, approximately, polymerization is performed at a temperature of −50 degree C. to 150 degree C. for 1 hour to 50 hours. Depending on cases, the polymerizable composition is preferably held in a temperature range of 10 degree C. to 150 degree C. or slowly heated, and cured for 1 to 25 hours.

Similarly, even in a case where polymerization is performed by radiation such as UV, to prevent polymerization uniformity (striae) by convection, typically, polymerization is slowly conducted by dividing irradiation of radiation or reducing illuminance. For the purpose of making convection not further occur, a dual cure system in which by cooling overnight after a uniform polymerizable reactive composition is injected into a cavity, a state in which convection is less likely to occur is formed, and the semi-cured composition which has become a uniform gel state by irradiation with a weak radiation is completely cured by heating is taken in some cases.

For the purpose of removing the distortion due to polymerization completion or residual stress, the plastic lens obtained by releasing from the mold may be subjected to a re-heat treatment (annealing) as required. Typically, the heat treatment is performed within a range of 1 to 24 hours at Tg of the obtained plastic lens to Tg×2 times the temperature. A heat treatment condition of 1 to 16 hours at Tg to Tg×1.5 times the temperature is more preferable, and a heat treatment condition of 1 to 4 hours at Tg to Tg×1.2 times the temperature is still more preferable.

In a case where a curable resin of one embodiment and a plastic lens formed of the resin are produced by radiation, as the radiation used, energy rays having a wavelength range within a range of 0.0001 to 800 nm are typically used. The radiation is classified into $f_{\zeta}$, rays, fA rays, fÁ rays, X-rays, electron beams, ultraviolet rays, visible light, and the like, and can be suitably selected according to the composition of the mixture and used. Among the radiation, ultraviolet rays is preferable, and the output peak of ultraviolet rays is preferably within a range of 200 to 450 nm, more preferably within a range of 230 to 445 nm, still more preferably within a range of 240 to 430 nm, and still more preferably within a range of 250 to 400 nm. By using ultraviolet rays within the range of the output peak, defects such as yellowing and thermal deformation at the time of polymerization are small, and it is possible to complete the polymerization in a relatively short period of time even in a case where an ultraviolet absorbent is added.

In addition, in a case where an ultraviolet absorbent and a hindered amine-based stabilizer are added in the composition, there is a tendency that ultraviolet rays having an energy output peak of ultraviolet rays within a range of 250 to 280 nm or within a range 370 to 430 nm is preferably used.

The curable resin of one embodiment and the plastic lens formed of the resin obtained in the above manner may be subjected to processing of imparting various functionalities by providing a functional coat layer such as a hard coat, an anti-reflection coat, a dimming coat, a slipperiness-imparting coat or a slipperiness-imparting treatment, or an anti-static coat to the surface, by performing a dyeing treatment for imparting fashionability, by performing a treatment of the surface, the edge, or the like, and by putting a polarizing film in the interior for the purpose of imparting polarizability or attaching a polarizing film to the surface.

For the purpose of improving adhesion between the functional coat layer and the substrate, the surface of the obtained curable resin of one embodiment or the plastic lens formed of the resin can also be subjected to a corona treatment, an ozone treatment, a low-temperature plasma treatment using oxygen gas or nitrogen gas, a glow discharge treatment, an oxidation treatment by chemicals, or a physical or chemical treatment such as a flame treatment.

Instead of these treatments or in addition to these treatments, a primer layer formed by a primer treatment, an undercoat treatment, or an anchor coat treatment may be provided between the surface of the curable resin of one embodiment or the plastic lens formed of the resin and the outermost layer (air contact surface) formed by the physical or chemical treatment.

As the coating agent used in the primer layer, for example, a coating agent which has a resin such as a polyester-based resin, a polyamide-based resin, a polyurethane-based resin, an epoxy-based resin, a phenol-based resin, a (meth)acrylic resin, a polyvinyl acetate resin, a polyolefin-based resin of polyethlene or polypropylene or a copolymer thereof or a modified resin, or a cellulose-based resin as the main component of vehicle can be used. The coating agent may be any one of a solvent type coating agent and an aqueous type coating agent.

Among these coating agents, a modified polyolefin-based coating agent, an ethyl vinyl alcohol-based coating agent, a polyethylene imine-based coating agent, a polybutadiene-based coating agent, or a polyurethane-based coating agent; a polyester-based polyurethane emulsion coating agent, a polyvinyl chloride emulsion coating agent, a urethane acryl emulsion coating agent, a silicon acryl emulsion coating agent, a vinyl acetate acryl emulsion coating agent, or an acryl emulsion coating agent; or a styrene-butadiene copolymer latex coating agent, an acrylonitrile-butadiene copolymer latex coating agent, a methyl methacrylate-butadiene copolymer latex coating agent, a chloroprene latex coating agent, a rubber-based latex coating agent of polybutadiene latex, a polyacrylic acid ester latex coating agent, a polyvinylidene chloride latex coating agent, a polybutadiene latex coating agent, or a coating agent formed of carboxylic acid-modified product latex or dispersion of a resin included in these latex coating agents is preferable.

These coating agents can be applied, for example, by a dip coating method, a spin coating method, or a spray coating method, and the coating amount to a substrate is typically 0.05 g/m$^2$ to 10 g/m$^2$ in the dry state.

Among these coating agents, a polyurethane-based coating agent is more preferable. The polyurethane-based coating agent is a coating agent having a urethane bond in the main chain or the side chain of the resin included in the coating agent. The polyurethane-based coating agent is, for example, a coating agent including polyurethane obtained by reacting polyol such as polyester polyol, polyether polyol, or acrylic polyol with an isocyanate compound.

Among these polyurethane-based coating agents, a polyurethane-based coating agent obtained by mixing polyester polyol such as condensed polyester polyol or lactone-based polyester polyol and an isocyanate compound such as tolylene diisocyanate, hexamethylene diisocyanate, or xylylene diisocyanate is preferable from the viewpoint of excellent adhesion.

The method of mixing a polyol compound and an isocyanate compound is not particularly limited. In addition, the blending ratio is also not particularly limited, but if the isocyanate compound is too small, curing defects occur in some cases, and thus, the OH groups of the polyol compound and the NCO groups of the isocyanate compound are preferably within a range of 2/1 to 1.40 in terms of equivalent.

The curable resin of one embodiment may be applied to those other than plastic lenses, and as applications other than plastic lenses, a sheet, a film, and the like produced in the same manner as in plastic lenses using a flat mold are exemplified. The surface of the sheet, the film, or the like formed of the curable resin of one embodiment may be physically or chemically treated in the same manner as in plastic lenses, and the primer layer described above and the functional outermost layer (air contact surface) formed by a physical or chemical treatment may be laminated.

The plastic lens formed of the curable resin of one embodiment may be a laminate including the primer layer between the functional outermost layer (air contact surface) formed by a physical or chemical treatment described above and the curable resin surface.

The plastic lens of the present embodiment obtained in the above manner can be used in various lens applications such as an eyeglass lens, a camera lens, a pickup lens, a Fresnel lens, a prism lens, and a lenticular lens. Examples of a particularly preferable application among these include an eyeglass lens, a camera lens, and a pickup lens, having a smooth surface.

The sheet and the film of one embodiment obtained in the same manner can be used in various planar member applications requiring high transparency, such as display members including a flat panel and a smart phone panel, film members including a scatterproof film, a specific wavelength-cutting film, and a decorative film, and glass alternative members including building window glass, vehicle window glass, and a mirror.

EXAMPLES

Hereinafter, the present invention will be described in more detail based on Examples, but the invention is not intended to be limited to these.
(Thickening Speed Measurement)

Comparative Example a1

Preparation Method of Comparative Example a1
To a vial, 30 mg (3,000 ppm) of butoxyethyl acid phosphate were added to 4.07 g (40.7 parts by weight) of metaxylylene diisocyanate, and stirred at 15 degree C. Subsequently, 4.93 g of (49.3 parts by weight) a composition containing 5,7-dimercaptomethyl-1,11-dimercapto-3,6,9-trithiaundecane, 4,7-dimercaptomethyl-1,11-dimercapto-3, 6,9-trithiaundecane, and 4,8-dimercaptomethyl-1,11-dimercapto-3,6,9-trithiaundecane was added thereto and mixed. Then, 1.0 g (10 parts by weight) of metaxylylene diisocyanate in which 0.8 mg (80 ppm) of dimethyltin dichloride (manufactured by Sigma-Aldrich(R)) had been dissolved was added thereto, and stirred continuously at 15 degree C. The time of addition was set to 0 minute, and using a viscometer (manufactured by Brookfield AMETEK(R)), changes in viscosity during stirring was examined.

Comparative Examples a2 and a3

Preparation Method of Comparative Example a2
To a vial, 0.2 g (2 parts by weight) of PPG (polypropylene glycol manufactured by Sigma-Aldrich(R)), and 30 mg (3,000 ppm) of butoxyethyl acid phosphate were added to 4.07 g (40.7 parts by weight) of metaxylylene diisocyanate, and stirred at 15 degree C. Subsequently, 4.93 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed. Then, 1.0 g (10 parts by weight) of metaxylylene diisocyanate in which 0.8 mg (80 ppm) of dimethyltin dichloride (manufactured by Sigma-Aldrich(R)) had been dissolved was added thereto, and stirred continuously at 15 degree C. The time of addition was set to 0 minute, and using a viscometer (manufactured by Brookfield AMETEK(R)), changes in viscosity during stirring was examined. Comparative Example a2 includes polypropylene glycol (Mw 2,000) manufactured by Sigma-Aldrich(R). Mw represents a weight average molecular weight.
Preparation Method of Comparative Example a3
To a vial, 0.2 g (2 parts by weight) of PEG (polyethylene glycol manufactured by Sigma-Aldrich(R)), and 30 mg (3,000 ppm) of butoxyethyl acid phosphate were added to 4.07 g (40.7 parts by weight) of metaxylylene diisocyanate, and stirred at 15 degree C. Subsequently, 4.93 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed. Then, 1.0 g (10 parts by weight) of metaxylylene diisocyanate in which 0.8 mg (80 ppm) of dimethyltin dichloride (manufactured by Sigma-Aldrich(R)) had been dissolved was added thereto, and stirred continuously at 15 degree C. The time of addition was set to 0 minute, and using a viscometer (manufactured by Brookfield AMETEK(R)), changes in viscosity during stirring was examined. Comparative Example a3 includes polyethylene glycol (Mw 1,500) manufactured by Sigma-Aldrich(R). Mw represents a weight average molecular weight.

Examples a1-a3

Preparation Method of Examples a1-a3
To a vial, 0.2 g (2 parts by weight) of Polycaprolactone diol (PCL diol manufactured by Perstorp, or Sigma-Aldrich(R)), and 30 mg (3,000 ppm) of butoxyethyl acid phosphate were added to 4.07 g (40.7 parts by weight) of metaxylylene diisocyanate, and stirred at 15 degree C. Subsequently, 4.93 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9- trithiaundecane was added thereto and mixed. Then, 1.0 g (10 parts by weight) of metaxylylene diisocyanate in which 0.8 mg (80 ppm) of dimethyltin dichloride (manufactured by Sigma-Aldrich(R)) had been dissolved was added thereto, and stirred continuously at 15 degree C. The time of addition was set to 0 minute, and using a viscometer (manufactured by Brookfield AMETEK(R)), changes in viscosity during stirring was examined. Example a1 includes polycaprolactone diol (Mw 2,000) manufactured by Sigma-Aldrich(R), Example a2 includes CAPA(R) 2302 (Mw 3,000) manufactured by Perstorp, Example a3 includes CAPA(R) 2402 (Mw 4,000) manufactured by Perstorp. Mw represents a weight average molecular weight.

(Viscosity Measurement Method)

Measurement was performed by using the Brookfield Viscometer (Model: DV1MLV) and the spindle used is CPA-51Z. Data of changes in viscosity were obtained at different time intervals after the addition of the catalyst and the results are shown in Table 1.

TABLE 1

| | Amount of catalyst | Amount of polymer additive added | Viscosity of composition (mPa · s) | | | |
|---|---|---|---|---|---|---|
| | DMC (ppm) | (parts by weight) | 0 hour | 1 hour | 3 hours | 5 hours |
| Comparative Example a1: Blank | 80 | 0 | | 17 | 29 | 48 |
| Comparative Example a2: PPG (MW 2,000) | 80 | 2 | 19 | 37 | 94 | 188 |
| Comparative Example a3: PEG (MW 1,500) | 80 | 2 | 36 | 111 | 576 | 1800 |
| Example a1: PCL diol (MW 2,000) | 80 | 2 | 18 | 22 | 36 | 69 |
| Example a2: CAPA ® 2302 (MW 3,000) | 80 | 2 | 17 | 21 | 31 | 49 |
| Example a3: CAPA ® 2402 (MW 4,000) | 80 | 2 | 19 | 23 | 34 | 52 |

In Table 1, the viscosity increased over the time of a polymerizable composition made of metaxylylene diisocyanate and 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, catalyzed by dimethyltin dichloride (manufactured by Sigma-Aldrich(R)) and with addition of 2% of polymer additive at 15 degree C. is shown. Polymer additives made of polycaprolactone diol have a similar viscosity increased as the polymerizable composition without addition (Blank), while polymer additives made of polyethylene glycol or polypropylene glycol induces a rapid viscosity increase. The viscosity after 5 hours was 69 mPa·s for example a1, 49 mPa·s for example a2, and 52 mPa·s for example a3, and even in the case of adding polycaprolactone diol, it was possible to secure a sufficient castable time. The results are shown in Table 1. From the above, it was found that by using polycaprolactone diol, viscosity increase is suppressed, handling properties become excellent, and it is possible to secure a sufficient casting time compared to the inventions in the related art.

(Photochromic Characteristics)

Measurement Method:

Measurement was performed by using a UV-VIS spectrometer (UV-1800 manufactured by Shimadzu Corporation) and a UV irradiation apparatus (gel imaging apparatus manufactured by ATTO Corporation). A pigment was colored by irradiation with UV rays having a wavelength of 312 nm for 2 minutes using a gel imaging apparatus after UV-VIS spectrum of the resin was measured first. Spectra after 20 seconds, 2 minutes, 5 minutes, 10 minutes, and 15 minutes after irradiation were measured, and the following information was obtained from the measured spectra.

f¢T % max: the amount of changes in light transmittance at 550 nm before and after coloring F1/2: color fading half-life Comparative Example a4

Preparation Method of Comparative Example a4

30.8 mg (684 ppm) of Reversacol Wembley Grey (manufactured by Vivimed) and 16.7 mg (376 ppm) of Reversacol Heath Green (manufactured by Vivimed) as photochromic compounds, and 150 mg (3,000 ppm) of butoxyethyl acid phosphate were added to 20.35 g (40.7 parts by weight) of metaxylylene diisocyanate, followed by stirring for dissolution using a stirring apparatus. Subsequently, 24.65 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 4.0 mg (80 ppm) of dimethyltin dichloride(manufactured by Sigma-Aldrich(R)) had been dissolved was added thereto, followed by stirring for 1 hour. After decompressing and degassing was performed in a degree of decompression of 133 to 400 Pa for 40 minutes using a vacuum pump, filtration through a 1 micrometre membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120 degree C. in an oven to prepare a molded body. The measurement results of the photochromic characteristics are shown in Table 2.

Comparative Example a5

Preparation Method of Comparative Example a5

A molded body was obtained by the same method as in Comparative Example a4 except for further adding 5.0 g (10 parts by weight) of PEG (polyethylene glycol (Mw 1,500)) manufactured by Aldrich). The measurement results of the photochromic characteristics are shown in Table 2.

Comparative Example a6

Preparation Method of Comparative Example a6

A molded body was obtained by the same method as in Comparative Example a4 except for further adding 1.0 g (2 parts by weight) of SONGSTAR SS-207 (Poly(diethylene glycol adipate) of Mw 1,850-2,150, manufactured by SongWon). The measurement results of the photochromic characteristics are shown in Table 2.

Comparative Example a7

Preparation Method of Comparative Example a7

24.6 mg (547 ppm) of Reversacol Wembley Grey (manufactured by Vivimed) and 13.3 mg (300 ppm) of Reversacol Heath Green (manufactured by Vivimed) as photochromic compounds, 1.0 g (2 parts by weight) of Pluronic L44 (manufactured by Adeka), and 150 mg (3,000 ppm) of butoxyethyl acid phosphate were added to 20.35 g (40.7 parts by weight) of metaxylylene diisocyanate, followed by stirring for dissolution using a stirring apparatus. Subsequently, 24.65 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 4.0 mg (80 ppm) of dimethyltin dichloride (manufactured by Sigma-Aldrich(R)) had been dissolved was added thereto, followed by stirring for 1 hour. After decompressing and degassing was performed in a degree of decompression of 133 to 400 Pa for 40 minutes using a vacuum pump, filtration through a 1 micrometre membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120 degree C. in an oven to prepare a molded body. The measurement results of the photochromic characteristics are shown in Table 2.

Examples a4 to a12

Preparation Method of Examples a4 to a12

30.8 mg (684 ppm) of Reversacol Wembley Grey (manufactured by Vivimed) and 16.7 mg (376 ppm) of Reversacol Heath Green (manufactured by Vivimed) as photochromic compounds for Examples a4 to a9 and a11 to a12, or 24.6 mg (547 ppm) of Reversacol Wembley Grey (manufactured by Vivimed) and 13.3 mg (300 ppm) of Reversacol Heath Green (manufactured by Vivimed) as photochromic compounds for Examples a10, 1.0 g (2 parts by weight) of polycaprolactone diol, and 150 mg (3,000 ppm) of butoxyethyl acid phosphate were added to 20.35 g (40.7 parts by weight) of metaxylylene diisocyanate, followed by stirring for dissolution using a stirring apparatus. Subsequently, 24.65 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 4.0 mg (80 ppm) of dimethyltin dichloride (manufactured by Sigma-Aldrich(R)) had been dissolved was added thereto, followed by stirring for 1 hour. After decompressing and degassing was performed in a degree of decompression of 133 to 400 Pa for 40 minutes using a vacuum pump, filtration through a 1 micrometre membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120 degree C. in an oven to prepare a molded body. This composition with polycaprolactone diol was able to be cast into a mold without having a rapid increase in viscosity in the middle of the process. Example a4 includes CAPA(R) 2302 (Mw 3,000), Example a5 includes CAPA(R) 2302A (Mw 3,000), Example a6 includes CAPA(R) 2303 (Mw 3,000), Examples a7 and a8 include CAPA(R) 2402 (Mw 4,000), and Example a9 includes CAPA(R) 2403D (Mw 4,000) manufactured by Perstorp as the polycaprolactone diol. Example a10 includes polycaprolactone diol (Mw 2,000) and Example a11 includes polycaprolactone diol (Mw 10,000) manufactured by Sigma-Aldrich(R). Example a12 includes CAPA(R) 3301 (Mw 3,000), a polycaprolactone triol manufactured by Sigma-Aldrich(R). Mw represents a weight average molecular weight. The measurement results of the photochromic characteristics are shown in Table 2.

TABLE 2

| Entry | Polymer additive | | Amount (parts by weight) | Photochromic dye | Amount (ppm) | Photochromic characterization | |
|---|---|---|---|---|---|---|---|
| | | | | | | ΔT % @550 nm (%) | Fading speed $t_{1/2}$ (s) |
| Comp. Ex. a4 | None | — | — | Reversacol Wembley grey | 684 | 26 | 228 |
| | | | | Reversacol Heath green | 376 | | |
| Comp. Ex. a5 | PEG (Mn: 1500) | Aldrich | 10 | Reversacol Wembley grey | 684 | 32 | 204 |
| | | | | Reversacol Heath green | 376 | | |
| Comp. Ex. a6 | SS-207 | Song Won | 2 | Reversacol Wembley grey | 684 | 38 | 324 |
| | | | | Reversacol Heath green | 376 | | |
| Comp. Ex. a7 | Pluronic L44 | Adeka | 2 | Reversacol Wembley grey | 547 | 60 | 408 |
| | | | | Reversacol Heath green | 300 | | |
| Ex a4 | CAPA ® 2302 (Mw 3,000) | Perstorp | 2 | Reversacol Wembley grey | 684 | 71 | 222 |
| | | | | Reversacol Heath green | 376 | | |

TABLE 2-continued

| Entry | Polymer additive | | Amount (parts by weight) | Photochromic dye | Amount (ppm) | ΔT % @550 nm (%) | Fading speed $t_{1/2}$ (s) |
|---|---|---|---|---|---|---|---|
| Ex a5 | CAPA® 2302A (Mw 3,000) | Perstorp | 2 | Reversacol Wembley grey | 684 | 72 | 192 |
| | | | | Reversacol Heath green | 376 | | |
| Ex a6 | CAPA® 2303 (Mw 3,000) | Perstorp | 2 | Reversacol Wembley grey | 684 | 74 | 198 |
| | | | | Reversacol Heath green | 376 | | |
| Ex a7 | CAPA® 2402 (Mw 4,000) | Perstorp | 2 | Reversacol Wembley grey | 684 | 74 | 120 |
| | | | | Reversacol Heath green | 376 | | |
| Ex a8[1] | CAPA® 2402 (Mw 4,000) | Perstorp | 2 | Reversacol Wembley grey | 684 | 67 | 111 |
| | | | | Reversacol Heath green | 376 | | |
| Ex a9 | CAPA® 2403D (Mw 4,000) | Perstorp | 2 | Reversacol Wembley grey | 684 | 72 | 108 |
| | | | | Reversacol Heath green | 376 | | |
| Ex a10 | Polycaprolactone diol (Mw 2,000) | Aldrich | 2 | Reversacol Wembley grey | 547 | 68 | 264 |
| | | | | Reversacol Heath green | 300 | | |
| Ex a11 | Polycaprolactone diol (Mw 10,000) | Aldrich | 2 | Reversacol Wembley grey | 684 | 76 | 120 |
| | | | | Reversacol Heath green | 376 | | |
| Ex a12 | CAPA® 3301 (Mw 3,000) | Perstorp | 2 | Reversacol Wembley grey | 684 | 56 | 300 |
| | | | | Reversacol Heath green | 376 | | |

[1]Dimethyltin dichloride (DMC) used at 120 ppm instead of 80 ppm.

Comparative Example a8

Preparation Method of Comparative Example a8

30.8 mg (684 ppm) of Reversacol Wembley Grey (manufactured by Vivimed) and 16.7 mg (376 ppm) of Reversacol Heath Green (manufactured by Vivimed) as photochromic compounds, and 150 mg (3,000 ppm) of butoxyethyl acid phosphate were added to 25.35 g (50.7 parts by weight) of 2,5-bis(isocyanatomethyl) bicyclo-[2.2.1]-heptane and 2,6-bis(isocyanatomethyl) bicyclo-[2.2.1]-heptane, followed by stirring for dissolution using a stirring apparatus. Subsequently, 11.95 g (23.9 parts by weight) of pentaerythritol tetrakis 3-mercaptopropionate was added to this solution, followed by stirring for 30 minutes. 12.75 g (25.5 parts by weight) of 4-mercaptomethyl-1,8-dimercapto-3,6-dithiaoctane in which 30 mg (600 ppm) of dibutyltin dichloride (manufactured by Sigma-Aldrich(R)) had been dissolved was added thereto, followed by stirring for 1 hour. After decompressing and degassing was performed in a degree of decompression of 133 to 400 Pa for 30 minutes using a vacuum pump, filtration through a 1 micrometre membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120 degree C. in an oven to prepare a molded body. The measurement results of the photochromic characteristics are shown in Table 3.

Comparative Example a9

Preparation Method of Comparative Example a9

A molded body was obtained by the same method as in Comparative Example a8 except for further adding 5.0 g (10 parts by weight) of PEG (polyethylene glycol (Mw 1,500)) manufactured by Aldrich). The measurement results of the photochromic characteristics are shown in Table 3.

Comparative Example a10

Preparation Method of Comparative Example a10

A molded body was obtained by the same method as in Comparative Example a8 except for further adding 1.0 g (2 parts by weight) of Pluronic L44 (manufactured by Adeka). The measurement results of the photochromic characteristics are shown in Table 3.

Examples a13 to a19

Preparation Method of Examples a13 to a19

30.8 mg (684 ppm) of Reversacol Wembley Grey (manufactured by Vivimed) and 16.7 mg (376 ppm) of Reversacol Heath Green (manufactured by Vivimed) as photochromic compounds, 1.0 g (2 parts by weight) of polycaprolactone diol, and 150 mg (3,000 ppm) of butoxyethyl acid phosphate were added to 25.35 g (50.7 parts by weight) of a 2,5-bis(isocyanatomethyl) bicyclo-[2.2.1]-heptane and 2,6-bis(isocyanatomethyl) bicyclo-[2.2.1]-heptane, followed by stirring for dissolution using a stirring apparatus. Subsequently, 11.95 g (23.9 parts by weight) of pentaerythritol tetrakis 3-mercaptopropionate was added to this solution, followed by stirring for 30 minutes. 12.75 g (25.5 parts by weight) of 4-mercaptomethyl-1,8-dimercapto-3,6-dithiaoctane in which 30 mg (600 ppm) of dibutyltin dichloride (manufactured by Sigma-Aldrich(R)) had been dissolved was added thereto, followed by stirring for 1 hour. After decompressing and degassing was performed in a degree of decompression of 133 to 400 Pa for 30 minutes using a vacuum pump, filtration through a 1 micrometre membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120 degree C. in an oven to prepare a molded body. This composition with polycaprolactone diol was able to be cast into a mold without having a rapid increase in viscosity in the middle of the process. Example a13 includes CAPA(R) 2302 (Mw 3,000), Example a14 includes CAPA(R) 2302A (Mw 3,000), Example a15 includes CAPA(R) 2303 (Mw 3,000), Example a16 includes CAPA(R) 2402 (Mw 4,000), and Example a17 includes CAPA(R) 2403D (Mw 4,000) manufactured by Perstorp as the polycaprolactone diol. Example a18 includes polycaprolactone diol (Mw 2,000) and Example a19 includes polycaprolactone diol (Mw 10,000) manufactured by Sigma-Aldrich(R) as the polycaprolactone diol. Mw represents a weight average molecular weight. The measurement results of the photochromic characteristics are shown in Table 3.

TABLE 3

| Entry | Polymer additive | | Amount (parts by weight) | Photochromic dye | Amount (ppm) | Photochromic characterization | |
|---|---|---|---|---|---|---|---|
| | | | | | | ΔT % @550 nm (%) | Fading speed $t_{1/2}$ (s) |
| Comp. Ex. a8 | None | — | — | Reversacol Wembley grey | 684 | 16 | >>>600 |
| | | | | Reversacol Heath green | 376 | | |
| Comp. Ex. a9 | PEG (Mn: 1500) | Aldrich | 10 | Reversacol Wembley grey | 684 | 31 | >>>600 |
| | | | | Reversacol Heath green | 376 | | |
| Comp. Ex. a10 | Pluronic L44 | Adeka | 2 | Reversacol Wembley grey | 684 | 42 | 330 |
| | | | | Reversacol Heath green | 376 | | |
| Ex a13 | CAPA® 2302 (Mw 3,000) | Perstorp | 2 | Reversacol Wembley grey | 684 | 34 | 252 |
| | | | | Reversacol Heath green | 376 | | |
| Ex a14 | CAPA® 2302A (Mw 3,000) | Perstorp | 2 | Reversacol Wembley grey | 684 | 35 | 264 |
| | | | | Reversacol Heath green | 376 | | |
| Ex a15 | CAPA® 2303 (Mw 3,000) | Perstorp | 2 | Reversacol Wembley grey | 684 | 31 | 216 |
| | | | | Reversacol Heath green | 376 | | |
| Ex a16 | CAPA® 2402 (Mw 4,000) | Perstorp | 2 | Reversacol Wembley grey | 684 | 72 | 90 |
| | | | | Reversacol Heath green | 376 | | |
| Ex a17 | CAPA® 2403D (Mw 4,000) | Perstorp | 2 | Reversacol Wembley grey | 684 | 70 | 96 |
| | | | | Reversacol Heath green | 376 | | |
| Ex a18 | Polycaprolactone diol (Mn 2,000) | Aldrich | 2 | Reversacol Wembley grey | 684 | 15 | 540 |
| | | | | Reversacol Heath green | 376 | | |
| Ex a19 | Polycaprolactone diol (Mn 10,000) | Aldrich | 2 | Reversacol Wembley grey | 684 | 70 | 84 |
| | | | | Reversacol Heath green | 376 | | |

From the above results, it was found that the poly(thio)urethane resin molded body including polycaprolactone diol with a weight average molecular weight of 2,000 g/mol or more and 10,000 g/mol or less can effectively exhibit a photochromic characteristics. The poly(thio)urethane resin molded body including polycaprolactone diol with a weight average molecular weight of 4,000 g/mol or more and 10,000 g/mol or less further effectively exhibited the fading speed faster than the fading speed of the poly(thio)urethane resin molded body including none or a block copolymer, Pluronic L44.

(Other Physical Properties (Mechanical Properties and the Like))

The heat resistance of the resins produced in Example a20 and Comparative Example a11, and the optical properties (refractive index and Abbe number) of the resins produced in Example a21 and Comparative Example a11 were measured in the following manner.

Heat resistance measuring method: the heat resistance was measured by a TMA penetration method (50 g of load, 0.5 mm at the tip of a pin, temperature rising rate of 10 degree C./min). The temperature of the intersection point of the tangent of the TMA curve at the time of thermal expansion and the tangent of the TMA curve at the time of decline was defined as a thermal deformation starting temperature.

Refractive index (ne) and Abbe number (fËe): measurement was performed at 20<C using a Pulfrich refractometer.

Example a20

Preparation of a monomer was performed in the same manner as in Example a7, then, the obtained photochromic composition was charged in a glass mold, and while raising the temperature from room temperature to 120 degree C. in an oven, heating and polymerization were performed. The mechanical properties and the like of the obtained resin molded body were measured. The measurement results are shown in Table 4.

Comparative Example a11

Polymerization and manufacturing of a resin molded body were performed in the same manner as in Comparative Example a4. The mechanical properties and optical properties of the obtained resin molded body were measured. The measurement results are shown in Table 4 and in Table 5.

Example a21

Preparation of a monomer was performed in the same manner as in Example a5, then, the obtained photochromic composition was charged in a glass mold, and while raising the temperature from room temperature to 120 degree C. in an oven, heating and polymerization were performed. The optical properties of the obtained resin molded body were measured. The measurement results are shown in Table 5.

TABLE 4

| | Heat resistance (° C.) |
| --- | --- |
| Comparative Example a11 (reference) | 100 |
| Example a20 (CAPA ®2402) | 99 |

From the above results, it was found that the heat resistance of the poly(thio)urethane resin molded body including polycaprolactone diol (CAPA(R) 2402) with a weight average molecular weight of 4,000 g/mol is not inferior to the poly(thio)urethane resin molded body without polycaprolactone diol. This indicates the benefit of the polycaprolactone diol to achieve excellent photochromic characteristics, while keeping excellent heat resistance.

TABLE 5

| | Refractive index (ne) | Abbe number (ve) |
| --- | --- | --- |
| Comparative Example a11 (reference) | 1.664 | 32 |

TABLE 5-continued

| | Refractive index (ne) | Abbe number (ve) |
| --- | --- | --- |
| Example a21 (CAPA ®2302A) | 1.664 | 31 |

From the above results, it was found the refractive index (ne) and Abbe number (fËe) of the poly(thio)urethane resin molded body including polycaprolactone diol (CAPA(R) 2302A) with a weight average molecular weight of 3,000 g/mol is not inferior to the poly(thio)urethane resin molded body without polycaprolactone diol. This indicates the benefit of the polycaprolactone diol to achieve excellent optical properties while maintaining the excellent optical properties.

Examples a22 to a27

Preparation Method of Example a22

30.8 mg (684 ppm) of Reversacol Wembley Grey (manufactured by Vivimed) and 16.7 mg (376 ppm) of Reversacol Heath Green (manufactured by Vivimed) as photochromic compounds, 0.5 g (1 parts by weight) of CAPA(R) 2302A (Mw 3,000), and 150 mg (3,000 ppm) of butoxyethyl acid phosphate were added to 20.35 g (40.7 parts by weight) of metaxylylene diisocyanate, followed by stirring for dissolution using a stirring apparatus. Subsequently, 24.65 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 4.0 mg (80 ppm) of dimethyltin dichloride (manufactured by Sigma-Aldrich(R)) had been dissolved was added thereto, followed by stirring for 1 hour. After decompressing and degassing was performed in a degree of decompression of 133 to 400 Pa for 40 minutes using a vacuum pump, filtration through a 1 micrometre membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120 degree C. in an oven to prepare a molded body. This composition with polycaprolactone diol was able to be cast into a mold without having a rapid increase in viscosity in the middle of the process. In Preparation Method of Examples a23 to a27, CAPA(R) 2302A (Mw 3,000) of Example a22 is replaced with following polycaprolactone diol.

Example a23 includes 2.0 g (4 parts by weight) of CAPA(R) 2302A (Mw 3,000), Example a24 includes 3.0 g (6 parts by weight) of CAPA(R) 2302A (Mw 3,000), Example a25 includes 5.0 g (10 parts by weight) of CAPA (R) 2302A (Mw 3,000), Examples a26 includes 0.5 g (1 parts by weight) of CAPA(R) 2403D (Mw 4,000) and Example a27 includes 3.0 g (6 parts by weight) of CAPA(R) 2403D (Mw 4,000) manufactured by Perstorp as the polycaprolactone diol.

Mw represents a weight average molecular weight. The measurement results of the photochromic characteristics are shown in Table 6.

TABLE 6

| Entry | Polymer additive | | Amount (parts by weight) | Photochromic dye | Amount (ppm) | Photochromic characterization | |
|---|---|---|---|---|---|---|---|
| | | | | | | ΔT % @550 nm (%) | Fading speed $t_{1/2}$ (s) |
| Ex a22 | CAPA ® 2302A (Mw 3,000) | Perstorp | 1 | Reversacol Wembley grey | 684 | 65 | 258 |
| | | | | Reversacol Heath green | 376 | | |
| Ex a23 | CAPA ® 2302A (Mw 3,000) | Perstorp | 4 | Reversacol Wembley grey | 684 | 71 | 168 |
| | | | | Reversacol Heath green | 376 | | |
| Ex a24 | CAPA ® 2302A (Mw 3,000) | Perstorp | 6 | Reversacol Wembley grey | 684 | 72 | 168 |
| | | | | Reversacol Heath green | 376 | | |
| Ex a25 | CAPA ® 2302A (Mw 3,000) | Perstorp | 10 | Reversacol Wembley grey | 684 | 75 | 144 |
| | | | | Reversacol Heath green | 376 | | |
| Ex a26 | CAPA ® 2403D (Mw 4,000) | Perstorp | 1 | Reversacol Wembley grey | 684 | 71 | 168 |
| | | | | Reversacol Heath green | 376 | | |
| Ex a27 | CAPA ® 2403D (Mw 4,000) | Perstorp | 6 | Reversacol Wembley grey | 684 | 68 | 96 |
| | | | | Reversacol Heath green | 376 | | |

From the above results, it was found that the poly(thio)urethane resin molded body including polycaprolactone diol in specific range can effectively exhibit a photochromic characteristics, especially a photochromic fading speed.

(Other Physical Properties)

The heat resistance of the resins produced in Example a22 to a27 was measured in the following manner. The measurement results are shown in Table 7.

Heat resistance measuring method: the heat resistance was measured by a TMA penetration method (50 g of load, 0.5 mmfÓ at the tip of a pin, temperature rising rate of 10 degree C./min). The temperature of the intersection point of the tangent of the TMA curve at the time of thermal expansion and the tangent of the TMA curve at the time of decline was defined as a thermal deformation starting temperature.

TABLE 7

| | Heat resistance (° C.) |
|---|---|
| Example a22 CAPA ® 2302A 1% | 92 |
| Example a23 CAPA ® 2302A 4% | 86 |
| Example a24 CAPA ® 2302A 6% | 82 |
| Example a25 CAPA ® 2302A 10% | 80 |
| Example a26 CAPA ®2403D 1% | 100 |
| Example a27 CAPA ®2403D 6% | 91 |

From the above results, it was found that the poly(thio)urethane resin molded body including polycaprolactone diol in specific range can effectively improve heat resistance.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms gcontain, f ghave, h ginclude, h and ginvolve h are used in either the detailed description or the claims, such terms are intended to be inclusive in a manner similar to the term gcomprising h as gcomprising h is interpreted when employed as a transitional word in a claim. In some instances, however, to the extent that the terms gcontain, f ghave, h ginclude, h and ginvolve h are used in either the detailed description or the claims, such terms are intended to be partially or entirely exclusive in a manner similar to the terms gconsisting of h or gconsisting essentially of h as gconsisting of h or gconsisting essentially of h are interpreted when employed as a transitional word in a claim.

The present application claims priority on the basis of Singapore Patent Application No. 10201710468Q filed on Dec. 15, 2017, the content of which is incorporated herein.

The invention claimed is:

1. A polymerizable composition for a plastic lens, comprising:
   a polyester polyol (a) having a weight average molecular weight of more than 4,000 g/mol and 10,000 g/mol or less;
   a photochromic compound (b); and
   a polymerization reactive compound (c), other than the polyester polyol (a),
   wherein the polymerization reactive compound (c) consisting of a combination of a polyiso(thio)cyanate compound and a polythiol compound having two or more mercapto groups, wherein the polyester polyol (a) is at least one selected from a polycaprolactone diol represented by the following General Formula (1) and a polycaprolactone polyol represented by the following General Formula (2),

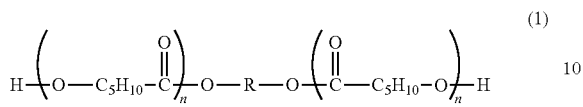

wherein, in General Formula (1), R represents the diol, and n represents a unit number of the caprolactone monomer, and each unit number is an integer of 2 to 88,

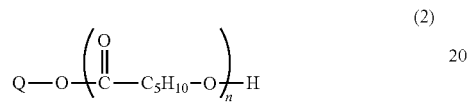

wherein, in general formula (2), Q represents the polyol with 3 or more primary hydroxyl groups, and n represents a unit number of the caprolactone monomer, and each unit number is an integer of 2 to 58, wherein the polythiol compound having two or more mercapto groups consists of one or more compounds selected from methanedithiol, 1,2-ethanedithiol, 1,2,3-propanetrithiol, 1,2-cyclohexanedithiol, bis(2-mercaptoethyl) ether, tetrakis(mercaptomethyl) methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl) sulfide, bis(mercaptomethyl)disulfide, bis(mercaptoethyl) sulfide, bis(mercaptoethyl)disulfide, bis(mercaptopropyl) sulfide, bis(mercaptomethylthio) methane, bis(2-mercaptoethylthio) methane, bis(3-mercaptopropylthio) methane, 1,2-bis(mercaptomethylthio) ethane, 1,2-bis(2-mercaptoethylthio) ethane, 1,2-bis(3-mercaptopropylthio) ethane, 1,2,3-tris(mercaptomethylthio) propane, 1,2,3-tris(2-mercaptoethylthio) propane, 1,2,3-tris(3-mercaptopropylthio) propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl) methane, tetrakis(2-mercaptoethylthiomethyl) methane, tetrakis(3-mercaptopropylthiomethyl) methane, bis(2,3-mercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, and esters of these thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethylester), thiodipropionic acid bis(2-mercaptoethylester), dithiodiglycolic acid bis(2-mercaptoethyl ester), dithiodipropionic acid bis(2-mercaptoethylester), 1,1,3,3-tetrakis(mercaptomethylthio) propane, 1,1,2,2-tetrakis(mercaptomethylthio) ethane, 4,6-bis(mercaptomethylthio)-1,3-dithiane, tris(mercaptomethylthio) methane, and tris(mercaptoethylthio) methane, 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy) benzene, 1,3,5-tris(mercaptoethyleneoxy) benzene, 2,5-toluenedithiol, 3,4-toluenedithiol, 1,5-naphthalenedithiol, and 2,6-naphthalenedithiol, 3,4-thiophene dithiol, bismuthiol, 4,6-bis(mercaptomethylthio)-1,3-dithiane, and 2-(2,2-bis(mercaptomethylthio) ethyl)-1,3-dithietane.

2. The polymerizable composition for optical materials according to claim 1,
wherein the photochromic compound (b) is a naphthopyran derivative.

3. The polymerizable composition for optical materials according to claim 1,
wherein the polyester polyol (a) is the polycaprolactone polyol of the General formula (2).

4. The polymerizable composition for optical materials according to claim 1,
wherein the polyester polyol (a) is the polycaprolactone diol of the General formula (1).

5. The polymerizable composition for optical materials according to claim 1,
wherein the polyiso(thio)cyanate compound is an aliphatic polyiso (thio) cyanate compound, an alicyclic polyiso(thio)cyanate compound, or an aromatic polyiso (thio) cyanate compound.

6. The polymerizable composition for optical materials according to claim 5,
wherein the aromatic polyiso(thio)cyanate compound is meta-xylylene diisocyanate,
wherein the aliphatic polyiso(thio)cyanate compound consists of one or more compounds selected from 2,5-bis(isocyanatomethyl) bicyclo-[2.2.1]-heptane, and 2,6-bis(isocyanatomethyl) bicyclo-[2.2.1]-heptane, and
wherein the polythiol compound having two or more mercapto groups consists of one or more compounds selected from pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

7. A cured body obtained by curing the polymerizable composition for optical materials according to claim 1.

8. A molded body obtained by curing the polymerizable composition in a mold for optical materials according to claim 1.

9. An optical material formed of the molded body according to claim 8.

10. A plastic lens formed of the molded body according to claim 8.

11. A production method of a polymerizable composition for optical materials, comprising:
mixing a polyester polyol (a) having a weight average molecular weight of more than 4,000 g/mol and 10,000 g/mol or less; a photochromic compound (b); and a polymerization reactive compound (c), other than the polyester polyol (a),
wherein the polymerization reactive compound (c) consisting of a combination of a polyiso(thio)cyanate compound and a polythiol compound having two or more mercapto groups,
wherein the polyester polyol (a) is at least one selected from a polycaprolactone diol represented by the following General Formula (1) and a polycaprolactone polyol represented by the following General Formula (2),

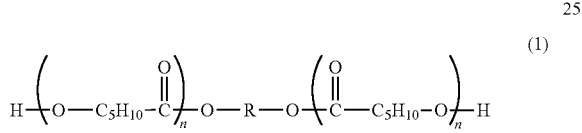

(1)

wherein, in General Formula (1), R represents the diol, and n represents a unit number of the caprolactone monomer, and each unit number is an integer of 2 to 88,

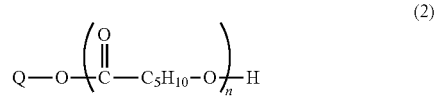

(2)

wherein, in general formula (2), Q represents the polyol with 3 or more primary hydroxyl groups, and n represents a unit number of the caprolactone monomer, and each unit number is an integer of 2 to 58,
wherein the polythiol compound having two or more mercapto groups consists of one or more compounds selected from methanedithiol, 1,2-ethanedithiol, 1,2,3-propanetrithiol, 1,2-cyclohexanedithiol, bis(2-mercaptoethyl) ether, tetrakis(mercaptomethyl) methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl) sulfide, bis(mercaptomethyl)disulfide, bis(mercaptoethyl) sulfide, bis(mercaptoethyl)disulfide, bis(mercaptopropyl) sulfide, bis(mercaptomethylthio) methane, bis(2-mercaptoethylthio) methane, bis(3-mercaptopropylthio) methane, 1,2-bis(mercaptomethylthio) ethane, 1,2-bis(3-mercaptoethylthio) ethane, 1,2-bis(3-mercaptopropylthio) ethane, 1,2,3-tris(mercaptomethylthio) propane, 1,2,3-tris(2-mercaptoethylthio) propane, 1,2,3-tris(3-mercaptopropylthio) propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl) methane, tetrakis(2-mercaptoethylthiomethyl) methane, tetrakis(3-mercaptopropylthiomethyl) methane, bis(2,3-mercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, and esters of these thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethylester), thiodipropionic acid bis(2-mercaptoethylester), dithiodiglycolic acid bis(2-mercaptoethyl ester), dithiodipropionic acid bis(2-mercaptoethylester), 1,1,3,3-tetrakis(mercaptomethylthio) propane, 1,1,2,2-tetrakis(mercaptomethylthio) ethane, 4,6-bis(mercaptomethylthio)-1,3-dithiane, tris(mercaptomethylthio) methane, and tris(mercaptoethylthio) methane, 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl) benzene, 1,3,5-tris(mercaptomethyleneoxy) benzene, 1,3,5-tris(mercaptoethyleneoxy) benzene, 2,5-toluenedithiol, 3,4-toluenedithiol, 1,5-naphthalenedithiol, and 2,6-naphthalenedithiol, 3,4-thiophene dithiol, bismuthiol, 4,6-bis(mercaptomethylthio)-1,3-dithiane, and 2-(2,2-bis(mercaptomethylthio) ethyl)-1,3-dithietane.

12. The production method of a polymerizable composition for optical materials according to claim 11,
wherein the photochromic compound (b) is a naphthopyran derivative.

13. The production method of a polymerizable composition for optical materials according to claim 11,
wherein the polyester polyol (a) is the polycaprolactone polyol of the General formula (2).

14. The production method of a polymerizable composition for optical materials according to claim 11,
wherein the polyester polyol (a) is the polycaprolactone diol of the General formula (1).

15. The production method of a polymerizable composition for optical materials according to claim 11,
wherein the mixing the polyester polyol (a), the photochromic compound (b), and the polymerization reactive compound (c) comprises forming polymer particles comprising the polyester polyol (a) and the photochromic compound (b), and then mixing the polymerization reactive compound (c) with the polymer particles.

16. The production method of a polymerizable composition for optical materials according to any claim 11,
wherein the mixing the polyester polyol (a), the compound (b), and the polymerization reactive compound (c) comprises mixing the polyester polyol (a), the compound (b), and one or more of the polymerization reactive compound (c) to make a mixture, and then mixing remaining polymerization reactive compound (c) with the mixture.

17. A production method of a cured body, comprising:
polymerizing and curing the polymerizable composition for optical materials according to claim 1,
wherein the method comprises forming a resin by polymerization of the polymerization reactive compound (c), forming a nanodomain separation structural body by the polyester polyol (a), and forming a cured body formed of the resin, the nanodomain separation structural body, and the compound (b).

18. A production method of a plastic lens comprising:
forming a lens substrate by cast-polymerizing the polymerizable composition for optical materials according to claim 1.

19. The production method of a plastic lens according to claim 18,
wherein the forming the lens substrate comprises forming a resin by polymerization of a polymerization reactive compound (c) and forming a nanodomain separation structural body by the polyester polyol (a), and forming a lens substrate formed of the resin, the nanodomain separation structural body, and the compound (b).

* * * * *